United States Patent
Miller et al.

(10) Patent No.: US 12,173,669 B1
(45) Date of Patent: Dec. 24, 2024

(54) TURBINE ENGINE WITH FAN BYPASS WATER INJECTION TO AUGMENT THRUST

(71) Applicant: General Electric Company, Schenectady, NY (US)

(72) Inventors: Brandon W. Miller, Middletown, OH (US); Arthur W. Sibbach, Boxford, MA (US); Jeffrey D. Rambo, Mason, OH (US); Daniel A. Niergarth, Norwood, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/452,203

(22) Filed: Aug. 18, 2023

(51) Int. Cl.
*F02K 3/02* (2006.01)
*F02K 3/06* (2006.01)

(52) U.S. Cl.
CPC ............... *F02K 3/025* (2013.01); *F02K 3/06* (2013.01); *F05D 2220/36* (2013.01); *F05D 2260/212* (2013.01); *F05D 2260/213* (2013.01); *F05D 2260/606* (2013.01)

(58) Field of Classification Search
CPC ... F02C 3/305; F02K 3/06; F02K 3/10; F05D 2260/211; F05D 2260/212; F05D 2260/213; F05D 2260/606
See application file for complete search history.

(56) References Cited

U.S. PATENT DOCUMENTS

| | | | | |
|---|---|---|---|---|
| 3,374,630 A | * | 3/1968 | Davison ................. | B63H 11/04 60/264 |
| 3,396,538 A | * | 8/1968 | Wetherbee, Jr. ....... | B63H 11/04 60/264 |
| 3,881,315 A | * | 5/1975 | Hess ........................ | F02K 3/06 239/265.19 |
| 4,631,914 A | | 12/1986 | Hines | |
| 5,896,740 A | | 4/1999 | Shouman | |
| 6,085,513 A | | 7/2000 | Hamill et al. | |
| 6,560,966 B1 | | 5/2003 | Fetescu et al. | |
| 6,983,605 B1 | | 1/2006 | Hook et al. | |

(Continued)

FOREIGN PATENT DOCUMENTS

| | | | | |
|---|---|---|---|---|
| CN | 114562385 A | * | 5/2022 | ............... F02K 3/04 |
| CN | 217783836 U | * | 11/2022 | |

(Continued)

*Primary Examiner* — Craig Kim

(74) *Attorney, Agent, or Firm* — Venable LLP; Edward A. Kmett; Michele V. Frank

(57) ABSTRACT

A gas turbine has a core turbine engine, and a fan having a plurality of fan blades. A nacelle surrounds the fan and at least a portion of the core turbine engine. The nacelle defines an inlet arranged upstream of the fan, and a bypass flow passage downstream of the fan defined between the nacelle and the core turbine engine. The gas turbine also includes a bypass flow passage water injection system that includes (a) at least one water injection nozzle assembly arranged to inject water into at least one of the inlet of the nacelle, or into the bypass flow passage, and (b) a water injection supply system arranged to supply water from a storage tank to the at least one water injection nozzle assembly. Water is provided by the bypass flow passage water injection system during a high power operating states of the gas turbine to augment thrust.

22 Claims, 10 Drawing Sheets

(56) References Cited

U.S. PATENT DOCUMENTS

| | | |
|---|---|---|
| 8,826,671 B2 | 9/2014 | Kim et al. |
| 9,464,573 B2 | 10/2016 | Remy et al. |
| 9,840,953 B2 * | 12/2017 | Kulkarni ............... F01N 3/04 |
| 10,041,417 B2 | 8/2018 | Horikawa et al. |
| 11,530,635 B2 * | 12/2022 | Kupratis ............... F02C 3/305 |
| 11,603,796 B2 | 3/2023 | Diosady et al. |
| 11,603,798 B1 * | 3/2023 | Terwilliger ............. F02C 7/18 |
| 11,808,209 B1 * | 11/2023 | Sobanski ............... F02C 6/18 |
| 2001/0039794 A1 * | 11/2001 | Rocklin ............... F02C 9/48 60/39.53 |
| 2002/0112465 A1 * | 8/2002 | Payling ............... F02C 7/224 60/39.53 |
| 2004/0177618 A1 * | 9/2004 | Placko ............... F02C 3/305 60/39.3 |
| 2011/0005196 A1 * | 1/2011 | Andersen ............ F02C 3/305 60/264 |
| 2013/0269311 A1 | 10/2013 | Wichmann et al. |
| 2015/0275762 A1 * | 10/2015 | Kenyon ............... F02C 7/14 60/39.17 |
| 2020/0182113 A1 * | 6/2020 | Kupratis ............... F02C 3/305 |
| 2023/0258130 A1 * | 8/2023 | Terwilliger ............. F02C 7/224 60/266 |
| 2023/0374911 A1 * | 11/2023 | Terwilliger ............. F02C 3/22 |
| 2023/0381683 A1 * | 11/2023 | Rivas ............... B01D 3/10 |
| 2023/0383672 A1 * | 11/2023 | Khamkar ............. F01K 23/101 |
| 2023/0417152 A1 * | 12/2023 | Mondal ............... F01D 5/02 |

FOREIGN PATENT DOCUMENTS

| | | | |
|---|---|---|---|
| EP | 3460197 A1 * | 3/2019 | ............... B64F 5/30 |
| EP | 4279719 A1 * | 11/2023 | ............... F02C 3/22 |
| FR | 3127269 A1 | 3/2023 | |
| FR | 3130896 A1 | 6/2023 | |
| FR | 3130897 A1 | 6/2023 | |
| FR | 3133367 A1 | 9/2023 | |
| FR | 3133368 A1 | 9/2023 | |

* cited by examiner

TURBINE ENGINE WITH FAN BYPASS WATER INJECTION TO AUGMENT THRUST

TECHNICAL FIELD

The present disclosure relates generally to a turbine engine with fan bypass water injection to augment thrust.

BACKGROUND

High bypass gas turbine engines used in aircraft generally include a fan section and a core turbine engine section. A nacelle generally surrounds the fan section and the core turbine engine section and forms a bypass flow passage therewithin. A bypass flow of air from the fan section flows through the bypass flow passage and provides thrust.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
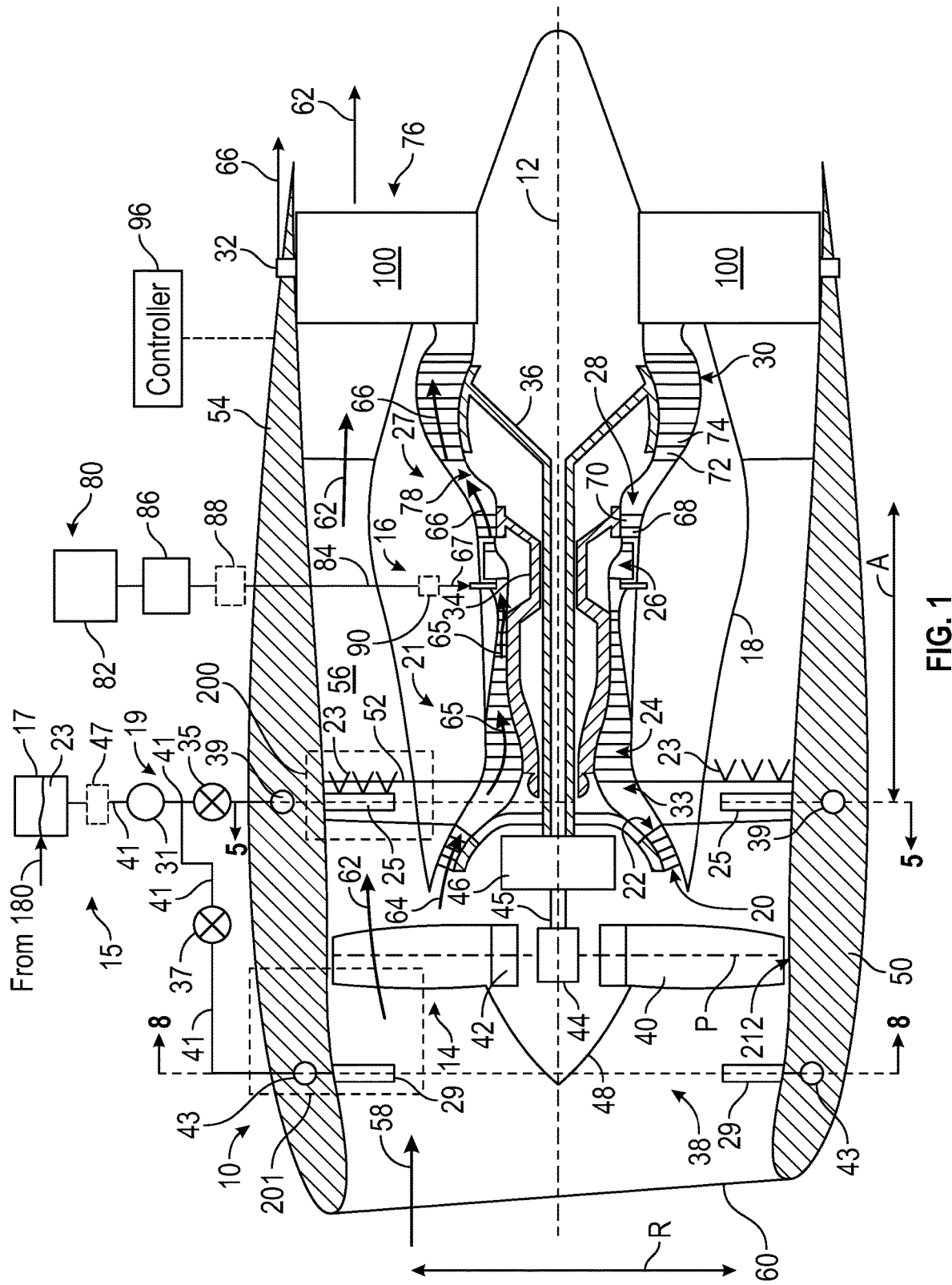
FIG. 1 is a schematic cross-sectional diagram of a turbine engine including a steam system, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide an explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

High bypass gas turbine engines used in aircraft generally include a fan section and a core turbine engine that drives the fan section. A nacelle generally surrounds the fan section and at least a portion of the core turbine engine. The nacelle includes an inlet upstream of the fan section and forms a bypass airflow passage downstream of the fan section, between the nacelle and the core turbine engine. In operation, air is input to the inlet and a fan in the fan section provides a flow of air therethrough and into the bypass airflow passage. Another portion of the air flows through the fan and into the core turbine engine. The air flowing through the bypass airflow passage provides thrust, and generally provides the greatest percentage of thrust for the gas turbine engine as compared to thrust provided by the core turbine engine. In some operating states of the gas turbine engine, additional thrust may be desirable.

The present disclosure provides a technique to augment (i.e., increase) the thrust of the gas turbine engine by injecting water into the fan section or into the bypass airflow passage of the gas turbine engine. According to the present disclosure, the gas turbine engine includes a water injection system that includes a water storage tank (arranged anywhere on an aircraft), and a water supply system that provides a flow of water from the water storage tank to at least one water injection nozzle assembly. The water injection nozzle assembly may be located within the bypass airflow passage (e.g., within nacelle struts supporting the nacelle) to inject water downstream of the fan within the bypass airflow passage. Alternatively, the water injection nozzle assembly may be arranged upstream of the fan within the nacelle inlet. Water can then be injected into the fan, albeit preferably directed at a zero degree attack angle with respect to a leading edge of the fan blades so as to reduce the potential for erosion of the fan blades. In both aspects, when thrust augmentation may be desired (e.g., during takeoff and climb out), water can be injected into the fan or into the bypass airflow passage to temporarily increase the thrust of the gas turbine engine.

Referring now to the drawings, FIG. 1 is a schematic cross-sectional diagram of an exemplary gas turbine engine 10 that includes a steam system 100, taken along a longitudinal centerline axis 12 (provided for reference) of the gas turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the gas turbine engine 10 includes a fan section 14 and a core turbine engine 16 disposed downstream from the fan section 14.

The core turbine engine 16 includes an outer casing 18 that defines an annular inlet 20 of the core turbine engine 16. As schematically shown in FIG. 1, the outer casing 18 encases, in serial flow relationship, a compressor section 21 including a booster or a low-pressure compressor (LPC) 22 followed downstream by a high-pressure compressor (HPC) 24, a combustor 26, a turbine section 27 including a high-pressure turbine (HPT) 28 followed downstream by a low-pressure turbine (LPT) 30, and one or more core exhaust nozzles 32. A high-pressure (HP) shaft 34 drivingly connects the HPT 28 to the HPC 24 to rotate the HPT 28 and the HPC 24 in unison. A low-pressure (LP) shaft 36 drivingly connects the LPT 30 to the LPC 22 to rotate the LPT 30 and the LPC 22 in unison. The compressor section 21, the combustor 26, the turbine section 27, and the one or more core exhaust nozzles 32 together define a core air flowpath 33.

For the embodiment depicted in FIG. 1, the fan section 14 includes a fan 38 (e.g., a variable pitch fan) having a plurality of fan blades 40 coupled to a disk 42 in a circumferentially spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears (not shown) for adjusting the rotational speed of the fan shaft 45 and, thus, for adjusting the rotational speed of the fan 38 relative to the LP shaft 36.

Referring still to the exemplary embodiment of FIG. 1, the disk 42 is covered by a rotatable fan hub 48 that is aerodynamically contoured to promote an airflow through the plurality of fan blades 40. In addition, the fan section 14 includes an annular fan casing or a nacelle 50 that circumferentially surrounds the fan section 14 and/or at least a portion of the core turbine engine 16. The nacelle 50 is supported relative to the core turbine engine 16 by a plurality of circumferentially spaced struts or outlet guide vanes 52. Moreover, a downstream section 54 of the nacelle 50 extends over an outer portion of the core turbine engine 16 to define a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

The gas turbine engine 10 also includes a bypass airflow passage water injection system 15 that includes a water injection supply system 19 that, as will be described below, is arranged to supply water 23 from a water storage tank 17 to at least one water injection nozzle assembly 25, which may be arranged within the bypass airflow passage 56, and/or to at least one water injection nozzle assembly 29 that may be arranged upstream of the fan 38 within a nacelle inlet 60 of the nacelle 50. The water storage tank 17 may be arranged within the nacelle 50, within an engine strut (not shown) connecting the gas turbine engine 10, or within any of one or more locations within an aircraft on which the gas turbine engine 10 is mounted (e.g., within a wing of the aircraft or within a fuselage of the aircraft). The water storage tank 17 may also include a heating element (not shown) to heat the water 23 within the water storage tank 17. The water injection supply system 19 may include, for example, a water pump 31, a water valve 35, a water valve 37, a first manifold 39, and a second manifold 43, each of which is connected together via water supply lines 41 to provide a flow of the water 23 therethrough. Optionally, a heat exchanger 47 may be included within the water injection system 19 to heat the water 23 flowing from the water storage tank 17 through water injection system 19 prior to the water 23 being injected into the bypass airflow passage 56, or prior to the water 23 being injected into the fan section 14. The heat exchanger 47 may utilize any type of heat source to heat the water 23, such as, for example, a compressor discharge airflow from the compressor section 21, exhaust from the core turbine engine 16, engine oil from an oil heat exchanger (not shown) of the core turbine engine 16, or steam from the steam system 100. Alternatively, the heat exchanger 47 may be an electric heater that provides on-demand heating of the water 23 flowing therethrough. Heating the water 23 prior to injection into the bypass airflow passage 56 may help to reduce the potential for freezing of the water 23 being injected into the bypass airflow passage 56. Each of the water pump 31, the water valve 35, and the water valve 37 may be controlled by a controller 96. The water valve 35 may be implemented to control a flow of the water 23 to the first manifold 39, while the water valve 37 may be implemented to control the flow of the water 23 to the second manifold 43. The first manifold 39 extends circumferentially about the longitudinal centerline axis 12 and may be arranged within the nacelle 50. The first manifold 39 is in fluid communication with the water injection nozzle assemblies 25 to provide a flow of the water 23 from the first manifold 39 to each of the water injection nozzle assemblies 25. Similarly, the second manifold 43 extends circumferentially about the longitudinal centerline axis 12 and may be arranged within the nacelle 50. The second manifold 43 is in fluid communication with the water injection nozzle assemblies 29 to provide a flow of the water 23 from the second manifold 43 to each of the water injection nozzle assemblies 29. The bypass airflow passage water injection system 15 is preferably configured so as to provide a flow of the water 23 into the bypass airflow passage 56 at a pressure of at least one hundred pounds per square inch. The arrangement of the water injection nozzle assemblies 25 and the arrangement of the water injection nozzle assemblies 29, along with operation of the bypass airflow passage water injection system 15 will be described in more detail below.

During operation of the gas turbine engine 10, a volume of inlet air 58 enters the gas turbine engine 10 through the nacelle inlet 60 of the nacelle 50 or the fan section 14. As the volume of inlet air 58 passes across the fan blades 40, a first portion of air (bypass air 62) is directed or routed into the bypass airflow passage 56, and a second portion of air (core air 64) is directed or is routed into the upstream section of the core air flowpath 33, or, more specifically, into the annular inlet 20 of the LPC 22. The ratio between the bypass air 62 and the core air 64 is known as a bypass ratio. In some embodiments, the bypass ratio is greater than 20:1, enabled, at least in part by the steam system 100, detailed further below. The pressure of the core air 64 is then increased by the LPC 22, generating compressed air 65, and the compressed air 65 is routed through the HPC 24 and further compressed by a series of HPC stages that each includes an HPC compressor rotor and HPC stator vanes (shown generally in FIG. 1 as forming the HPC 24) before being directed into the combustor 26, where the compressed air 65 is mixed with fuel 67 and burned to generate combustion gases 66 (combustion products). One or more stages may be used in each of the LPC 22 and the HPC 24, with each subsequent stage further compressing the compressed air 65. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio greater than 20:1 is enabled, at least in part, by the steam system 100, as detailed further below.

The combustion gases 66 are routed into the HPT 28 and expanded through the HPT 28, where a portion of thermal energy and/or kinetic energy from the combustion gases 66 is extracted via only one stage of HPT stator vanes 68 that are coupled to the outer casing 18, and HPT rotor blades 70 that are coupled to the HP shaft 34, thus, causing the HP shaft 34 to rotate, thereby supporting operation of the HPC 24. The combustion gases 66 are then routed into the LPT 30 and expanded through the LPT 30. Here, a second portion of thermal energy and/or the kinetic energy is extracted from the combustion gases 66 via sequential stages of LPT stator vanes 72 that are coupled to the outer casing 18 and LPT rotor blades 74 that are coupled to the LP shaft 36, thus, causing the LP shaft 36 to rotate, thereby supporting operation of the LPC 22 and rotation of the fan 38 via the gearbox assembly 46.

The combustion gases 66 are subsequently routed through the steam system 100 to the one or more core exhaust nozzles 32 of the core turbine engine 16 to provide propulsive thrust. The HPT 28, the LPT 30, the steam system 100, and the one or more core exhaust nozzles 32 at least partially define a hot gas path 78 for routing the combustion gases 66 through the core turbine engine 16.

Simultaneously with the flow of the core air 64 through the core air flowpath 33, the bypass air 62 is routed through the bypass airflow passage 56 before being exhausted from a fan bypass nozzle 76 of the gas turbine engine 10, also providing propulsive thrust. In addition, during some operating states of the gas turbine engine 10 (e.g., during a high-power operating state such as during takeoff or climb out), additional thrust provided through the bypass airflow passage 56 may be desirable. As will be described in more detail below, thrust augmentation may be achieved by injecting the water 23 into the bypass airflow passage 56 via the bypass airflow passage water injection system 15. When the thrust augmentation is required, the controller 96 controls the water injection supply system 19 so that the water 23 is provided to the water injection nozzle assemblies 25 and/or to the water injection nozzle assemblies 29. When the water injection supply system 19 is controlled to provide the water 23 to the water injection nozzle assemblies 25, the water 23 is injected directly into the bypass airflow passage 56 and mixes with the bypass air 62. When the water injection supply system 19 is controlled by the controller 96 to provide the water 23 to the water injection nozzle assemblies 29, the water 23 is injected into the nacelle inlet 60 upstream of the fan 38, with the injected water 23 then mixing with the bypass air 62 and passing through the bypass airflow passage 56. The injection of the water 23 into either the bypass airflow passage 56 or into the nacelle inlet 60 increases the mass of the bypass air 62. In addition, the water 23 may be injected into the bypass airflow passage 56 at a higher velocity than the velocity of the bypass air 62. Either one or both of the increase in mass or the increase in velocity provides for thrust augmentation.

As noted above, the compressed air 65 (i.e., the core air 64) is mixed with the fuel 67 in the combustor 26 to form a fuel and air mixture, and combusted, generating combustion gases 66 (combustion products). The fuel 67 can include any type of fuel used for turbine engines, such as, for example, sustainable aviation fuels (SAF) including biofuels, Jet A, Jet A-1 or other hydrocarbon fuels. The fuel 67 also may be a hydrogen-based fuel ($H_2$), and, while hydrogen-based fuel may include blends with hydrocarbon fuels, the fuel 67 used herein is preferably unblended, and referred to herein as hydrogen fuel. In some embodiments, the hydrogen fuel may comprise substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures.

The gas turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the gas turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a fuel pump 86 to induce the flow of the fuel 67 through the fuel delivery assembly 84 to the combustor 26.

In this way, the fuel pump 86 pumps the fuel 67 from the fuel tank 82, through the fuel delivery assembly 84, and into the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the fuel pump 86. The one or more vaporizers 88 are in thermal communication with at least one heat source, such as, for example, waste heat from the gas turbine engine 10 and/or from one or more systems of the aircraft (not shown). The one or more vaporizers 88 heat the liquid hydrogen fuel and the liquid hydrogen fuel is converted into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the fuel pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

In the FIG. 1 aspect, the gas turbine engine 10 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below. The present disclosure, however, is not limited to a gas turbine engine that includes the steam system 100, and, the present disclosure can be implemented in a gas turbine engine that does not include the steam system 100. With respect to the bypass airflow passage water injection system 15, however, as will be described below, the steam system 100 may be utilized to accumulate water from the steam system 100 and to provide the accumulated water to the water storage tank 17 so as to replenish the water 23 in the water storage tank 17.

A controller 96 is in communication with the gas turbine engine 10 for controlling aspects of the gas turbine engine 10. For example, the controller 96 is in two-way communication with the gas turbine engine 10 for receiving signals from various sensors and control systems of the gas turbine engine 10 and for controlling components of the gas turbine engine 10, as detailed further below. The controller 96, or components thereof, may be located onboard the gas turbine engine 10, onboard the aircraft, or can be located remote from each of the gas turbine engine 10 and the aircraft. The controller 96 can be a Full Authority Digital Engine Control (FADEC) that controls aspects of the gas turbine engine 10.

The controller 96 may also be a standalone controller or may be part of an engine controller to operate various systems of the gas turbine engine 10. In this embodiment, the controller 96 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 96 to perform operations. The controller 96 and, more specifically, the one or more processors are programmed or configured to perform these operations, such as the operations discussed further below. In some embodiments, the instructions can be executed by the one or more processors to cause the one or more processors to complete any of the operations and functions for which the controller 96 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein may make reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The gas turbine engine 10 depicted in FIG. 1 is by way of example only. In other exemplary embodiments, the gas turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
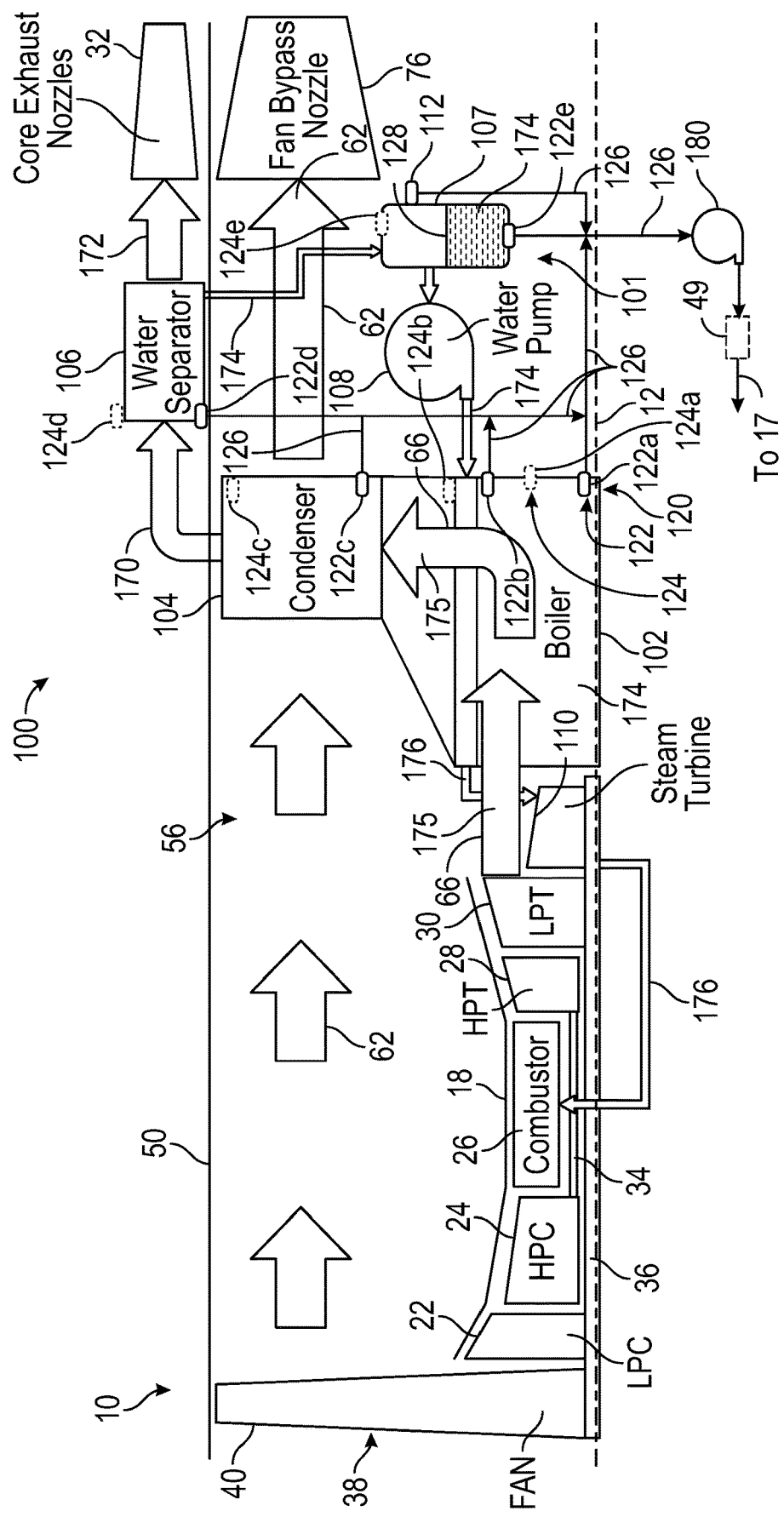
FIG. 2 is a schematic diagram of the turbine engine and the steam system of FIG. 1, according to the present disclosure.

FIG. 2 is a schematic diagram of the gas turbine engine 10 and the steam system 100 of FIG. 1, according to the present disclosure. For clarity, the various elements of the gas turbine engine 10 are shown schematically in FIG. 2 and some components are not shown in FIG. 2. The steam system 100 includes a boiler 102, a condenser 104, a water separator 106, one or more water tanks 107, a water pump 108, and a steam turbine 110. As will be described below, these and other components may, together, constitute a water accumulation system 101.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and may be positioned within the bypass airflow passage 56, or at other locations within the gas turbine engine 10. The condenser 104 can include any type of condenser for condensing water from the exhaust (e.g., the combustion gases 66).

The water separator 106 is in fluid communication with the condenser 104 for receiving cooled exhaust (i.e., combustion gases 66) having condensed water entrained therein. The water separator 106 is also in fluid communication with the one or more core exhaust nozzles 32 and with the one or more water tanks 107. The water separator 106 includes any type of water separator for separating water from the exhaust (air). For example, the water separator 106 can include a cyclonic separator that uses vortex separation to separate the water from the exhaust. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the gas turbine engine 10, such as, for example, radially inward of the nacelle 50, closer to the core turbine engine 16. The water separator 106 may be drivingly connected with, and driven by, one of the engine shafts, such as the HP shaft 34 or the LP shaft 36. As noted above, the boiler 102 receives liquid water from a water source to generate steam or water vapor. In the embodiment depicted in FIG. 2, the condenser 104, the water separator 106, or the one or more water tanks 107, individually or collectively, are the water source for the boiler 102.

The one or more water tanks 107 are in fluid communication with the water separator 106 and with the water pump 108. The one or more water tanks 107 are in fluid communication with the condenser 104 via the water separator 106. Each of the one or more water tanks 107 functions as an accumulator tank that is part of the water accumulation system 101 and accumulates water 174 from the water separator 106, as detailed further below. Each of the one or more water tanks 107 also includes an overflow drain 112 positioned at a top end of the one or more water tanks 107. The overflow drain 112 is positioned on the one or more water tanks 107 such that excess water 174 in the one or more water tanks 107 drains through the overflow drain 112 and out of the one or more water tanks 107, as detailed further below. In some embodiments, the overflow drain 112 includes a valve that opens to drain the water 174 through the overflow drain 112 and closes to prevent the water 174 from draining through the overflow drain 112. The valve can be, for example, a spring-loaded poppet valve, a check valve, or any other pressure relief valve.

The one or more water tanks 107 may also have a variable volume that is adjusted by an adjustable diaphragm 128. The water 174 in the water tank 107 fills to the level of the adjustable diaphragm 128. In this way, a level (e.g., a volume) of the water 174 in the water tank 107 is based on a position of the adjustable diaphragm 128 in the water tank 107. The adjustable diaphragm 128 can move up or move down within the water tank 107 to change the level (e.g., the volume) of the water 174 in the water tank 107. For example, the controller 96 (FIG. 1) controls the adjustable diaphragm 128 to move up or to move down to adjust the level of the water 174 in the water tank 107. In some embodiments, the adjustable diaphragm 128 moves up or moves down by a pressure within the water tank 107 such that the water tank 107 is passively pressurized. In this manner, the adjustable diaphragm 128 pressurizes the water tank 107.

In some embodiments, the one or more water tanks 107 are arranged in parallel such that each of the one or more water tanks 107 is separately fluidly coupled with the water pump 108 and the water separator 106. In some embodiments, the one or more water tanks 107 are arranged in series such that each of the one or more water tanks 107 is fluidly coupled with each other and the water 174 flows from one respective water tank 107 to another respective water tank 107. In some embodiments, the one or more water tanks 107 may be positioned at a bottom end of the gas turbine engine 10 such that the water 174 flows into, and out of, the one or more water tanks 107 by gravity. The one or more water tanks 107 can be positioned, for example, in the nacelle 50, inside a tail cone of the gas turbine engine 10, inside a wing of the aircraft, or within a fuselage of the aircraft. In embodiments in which the one or more water tanks 107 are positioned above the water separator 106 (e.g., such that the water 174 cannot flow to the one or more water tanks 107 via gravity), a scavenge pump (not shown) may be included at the water separator 106 to pump the water 174 from the water separator 106 to the one or more water tanks 107.

The water pump 108 is in fluid communication with the one or more water tanks 107 and with the boiler 102. The water pump 108 is in fluid communication with the water separator 106 via the one or more water tanks 107 and with the condenser 104 via the water separator 106. The water pump 108 may be any suitable type of pump, such as a centrifugal pump or a positive displacement pump. The water pump 108 directs separated liquid water through the boiler 102 where it is converted back to the steam 176. The steam 176 is sent through the steam turbine 100 and then injected into the combustor 26.

The steam system 100 also includes a drain system 120 to drain each of the boiler 102, the condenser 104, the water separator 106, and the one or more water tanks 107. The drain system 120 includes one or more drain valves 122 and one or more vents 124 on each of the boiler 102, the condenser 104, the water separator 106, and the one or more water tanks 107. The one or more drain valves 122 are connected to a series of drain lines 126 that allow the water to drain from each of the various components of the steam system 100 and the one or more vents 124 allow air to vent from each of the various components of the steam system 100, as detailed further below. The one or more drain valves 122 include valves that are controlled to be opened to allow the water to drain through the one or more drain valves 122 and the series of drain lines 126, and to be closed to prevent the water from draining through the one or more drain valves 122. The one or more vents 124 include valves that are controlled to be opened to allow the air to vent through the one or more vents 124, and to be closed to prevent the air from venting through the one or more vents 124.

The boiler 102 includes a first boiler drain valve 122a and a first boiler vent 124a, and a second boiler drain valve 122b and a second boiler vent 124b. The first boiler drain valve 122a and the first boiler vent 124a are in fluid communication with a first boiler flowpath of the boiler 102 (e.g., a flowpath through which the combustion gases 66 flow). The first boiler drain valve 122a is positioned at a bottom end of the first boiler flowpath of the boiler 102, and the first boiler vent 124a is positioned at a top end of the first boiler flowpath of the boiler 102. The second boiler drain valve 122b and the second boiler vent 124b are in fluid communication with a second boiler flowpath of the boiler 102 (e.g., a flowpath through which the water 174 flows). The second boiler drain valve 122b is positioned at a bottom end of the second boiler flowpath of the boiler 102, and the second boiler vent 124b is positioned at a top end of the second boiler flowpath of the boiler 102.

The condenser 104 includes a condenser drain valve 122c and a condenser vent 124c. The condenser drain valve 122c is positioned at a bottom end of the condenser 104, and the condenser vent 124c is positioned at a top end of the condenser 104. The water separator 106 includes a water separator drain valve 122d and a water separator vent 124d. The water separator drain valve 122d is positioned at a bottom end of the water separator 106, and the water separator vent 124d is positioned at a top end of the water separator 106. The one or more water tanks 107 each includes a water tank drain valve 122e and a water tank vent 124e. The water tank drain valve 122e is positioned at a bottom end of the one or more water tanks 107, and the water tank vent 124e is positioned at a top end of the one or more water tanks 107. Each of the first boiler drain valve 122a, the second boiler drain valve 122b, the condenser drain valve 122c, the water separator drain valve 122d, and the water tank drain valve 122e may be fluidly coupled to a water pump 180. The water pump 180 is fluidly connected to the water storage tank 17 and provides the flow of the water drained from any one or more of the boiler 102, the condenser 104, the water separator 106, and the one or more water tanks 107 to the water storage tank 17. In this manner, the water 23 in the water storage tank 17 can be replenished and utilized by the bypass airflow passage water injection system 15 to augment thrust in the bypass airflow passage 56. Optionally, a heat exchanger 49 may be implemented between the water pump 180 and the water storage tank 17 to heat the water prior to being supplied to the water storage tank 17. The heat exchanger 49 may be similar to the heat exchanger 47 described above.

In operation of the steam system 100, the combustion gases 66, also referred to as exhaust, flow from the LPT 30 into the boiler 102. The combustion gases 66 contain exhaust water 175 therewithin. The combustion gases 66 passing through the boiler 102 transfer heat into water 174 within the boiler 102, as detailed further below. The combustion gases 66 then flow from the boiler 102 into the condenser 104. The condenser 104 condenses the exhaust water 173 from the combustion gases 66. The bypass air 62 flows through the bypass airflow passage 56 and over or through the condenser 104 and extracts heat from the combustion gases 66, cooling the combustion gases 66 and condensing the exhaust water 173 from the combustion gases 66 to generate an exhaust-water mixture 170. The bypass air 62 is then exhausted out of the gas turbine engine 10 through the fan bypass nozzle 76 to generate thrust, as detailed above. The condenser 104 thus may be positioned in the bypass airflow passage 56.

The exhaust-water mixture 170 flows into the water separator 106. The water separator 106 separates water 174 from the exhaust of the exhaust-water mixture 170 to generate separate exhaust 172 and the water 174. The exhaust 172 is exhausted out of the gas turbine engine 10 through the one or more core exhaust nozzles 32 to generate thrust, as detailed above. The boiler 102, the condenser 104, and the water separator 106 thus also define a portion of the hot gas path 78 (FIG. 1) for routing the combustion gases 66, the exhaust-water mixture 170, and the exhaust 172 through the steam system 100 of the gas turbine engine 10.

The water 174 flows from the water separator 106 into the one or more water tanks 107. The one or more water tanks 107 store the water 174 therein. When the water 174 fills the one or more water tanks 107 to the overflow drain 112, excess water 174 drains out of the one or more water tanks 107 through the overflow drain 112 to the water pump 180. The water pump 180 is in fluid communication with the water storage tank 17 (FIG. 1) and provides the excess water 174 to the water storage tank 17 for use in the bypass airflow passage water injection system 15. The overflow drain 112 also maintains the water 174 in the one or more water tanks 107 at a desired maximum water level such that the one or more water tanks 107 do not overfill with the water 174.

During steady state operating conditions of the gas turbine engine 10, the steam system 100 produces enough water 174 to generate an amount of the steam 176 for maintaining operation of the gas turbine engine 10, also referred to as an operating level of the steam 176. In such steady state conditions, the steam system 100 generates an excess amount of the water 174 that fills the one or more water tanks 107 to the maximum water level and then the water 174 flows through the one or more water tanks 107 and to the boiler 102. For example, during steady state operating conditions, the input of the water 174 into the one or more water tanks 107 is greater than the output of the water 174 from the one or more water tanks 107 to the boiler 102.

The water pump 108 pumps the water 174 from the one or more water tanks 107 through one or more water lines (as indicated by the arrow for the water 174 in FIG. 2) and the water 174 flows through the boiler 102. As the water 174 flows through the boiler 102, the combustion gases 66 flowing through the boiler 102 transfer heat into the water 174 to vaporize the water 174 and to generate the steam 176. The steam turbine 110 includes one or more stages of steam turbine blades (not shown) and steam turbine stators (not shown). The steam 176 flows from the boiler 102 into the steam turbine 110, through one or more steam lines (as indicated by the arrow for the steam 176 in FIG. 2), causing the steam turbine 110 to rotate, thereby generating additional work in an output shaft connected to the steam turbine 110.

As noted above, the core turbine engine 16 includes shafts coupling various rotating components of the core turbine engine 16 and other thrust producing components such as the fan 38. In the core turbine engine 16 shown in FIG. 1, these shafts include the HP shaft 34 and/or the LP shaft 36. The steam turbine 110 is coupled to one of the shafts of the core turbine engine 16, such as the HP shaft 34 or the LP shaft 36. In the illustrated embodiment, the steam turbine 110 is coupled to the LP shaft 36. As the steam 176 flows from the boiler 102 through the steam turbine 110, the kinetic energy of this gas is converted by the steam turbine 110 into mechanical shaft work in the LP shaft 36. The reduced temperature steam 176 exiting the steam turbine 110 is then injected into, or upstream of the combustor 26. The steam 176 injected into combustor 26 adds mass flow to the core air 64 such that less core air 64 is needed to produce the same amount of work through the turbine section 27. In this way, the steam system 100 extracts additional work from the heat in the exhaust that would otherwise be wasted. The steam 176 injected into the combustor 26 is in a range of twenty percent to fifty percent of the mass flow through the core air flowpath 33 (FIG. 1).

The steam turbine 110 has a pressure expansion ratio in a range of 2:1 to 6:1. The pressure expansion ratio is a ratio of the pressure at an inlet of the steam turbine 110 to the pressure at an exit of the steam turbine 110. The steam turbine 110 contributes approximately twenty-five percent of the power to the LP shaft 36 (or to the HP shaft 34) when the steam system 100 recovers approximately seventy percent of the water 174 and converts the water 174 into the steam 176. The LPT 30 has a pressure expansion ratio in a range of 4.5:1 to 28:1. The steam 176 contributes from twenty percent to fifty percent of the mass flow through the core air flowpath 33 (FIG. 1). The steam turbine 110 expands the steam 176, thereby reducing the energy of the steam 176 and reducing the temperature of the steam 176 to approximately a temperature of the compressed air 65 (FIG. 1) discharged from the HPC 24. Such a configuration enables the steam 176 to reduce hot spots in the combustor 26 from the combustion of the fuel (e.g., in particular, when the fuel is supercritical or gaseous hydrogen).

The additional work that is extracted by the steam system 100 and the steam 176 injected directly into, or upstream of the combustor 26 enables a size of the core turbine engine 16 (FIG. 1) to be reduced, thereby increasing the bypass ratio of the gas turbine engine 10, as compared to turbine engines without the benefit of the present disclosure. In some embodiments, the turbine engine 10 has a bypass ratio greater than 18:1 and less than 30:1, preferably, in a range of 18:1 to 100:1. In this way, the steam system 100 can enable an increased bypass ratio in which the gas turbine engine 10 can move a larger mass of air through the bypass airflow passage 56 (FIG. 1), reducing the pressure ratio of the fan 38 and increasing the efficiency of the gas turbine engine 10 as compared to turbine engines without the benefit of the present disclosure.

The steam 176 injected into the combustor 26 also enables the HPT 28 to have a greater energy output with fewer stages of the HPT 28 as compared to HPTs without the benefit of the present disclosure. The additional mass flow from the steam 176 through the turbine section 27 helps to produce a greater energy output such that the HPT 28 may have only one stage capable of sustainably driving a higher number of stages of the HPC 24 (e.g., 10, 11 or 12 stage HPC) due to the higher mass flow (resulting from the steam injection) exiting the combustor 26. In some embodiments, the steam 176 injection enables a single stage HPT 28 to sustainably drive the HPC 24 without reducing an amount of work that the HPT 28 produces as compared to HPTs without the benefit of the present disclosure, while also reducing a weight of the HPT 28 and increasing an efficiency of the HPT 28, as compared to high pressure turbines without the benefit of the present disclosure.

With less core air 64 needed due to the added mass flow from the steam 176, the compression ratio of the HPC 24 is increased as compared to HPCs without the benefit of the present disclosure. In this way, the HPC 24 has a compression ratio greater than 20:1. Thus, the compression ratio of the HPC 24 is increased, thereby increasing the thermal efficiency of the gas turbine engine 10 as compared to high pressure compressors and turbine engines without the benefit of the present disclosure. Further, the HPC 24 may have a reduced throat area due to the added mass flow in the core turbine engine 16 provided by the steam injection. A reduced size (outer diameter) and weight of the HPC 24 is provided, as compared to turbine engines without the benefit of the present disclosure.

In some embodiments, the HPC stator vanes of at least two stages of the HPC 24 are variable stator vanes that are controlled to be pitched about a pitch axis to vary a pitch of the HPC stator vanes. In some embodiments, the HPC 24 also includes one or more compressor bleed valves (not shown) that are controlled to be opened and to be closed to bleed a portion of the compressed air 65 from the HPC 24. The one or more compressor bleed valves are preferably positioned between a fourth stage of the HPC 24 and a last stage of the HPC 24. The the variable HPC stator vanes, and the one or more compressor bleed valves, help to balance the air flow (e.g., the compressed air 65) through all stages of the HPC 24. Such a balance, in combination with the steam 176 injected into the combustor 26 to flow through the core air flowpath 33, enables the number of stages of the HPC 24 to be ten to twelve stages for compression ratios greater than 20:1.

During transient operating conditions of the gas turbine engine 10, the steam system 100 may not be able to extract enough water 174 from the combustion gases 66 to maintain the operating level of the steam 176 that is injected into the combustor 26. During such transient operating conditions, the input of the water 174 into the one or more water tanks 107 is less than the output of the water 174 from the one or more water tanks 107 to the boiler 102. Accordingly, the steam system 100 supplies the water 174 that has accumulated in the one or more water tanks 107 to the boiler 102 during transient conditions such that the water 174 drains from the water tank 107. In this way, the level of the water 174 in the one or more water tanks 107 decreases during the transient operating conditions.

Accordingly, the one or more water tanks 107 include two states including a first state and a second state. The first state occurs when the one or more water tanks 107 are being filled with the water 174 or maintains a level of the water 174 in the one or more water tanks 107. For example, the first state occurs during the steady state operation of the gas turbine engine 10 when the steam system 100 is able to extract a first amount of the water 174 that is an equal amount of the water 174 or a greater amount of the water 174 than is necessary for generating the operating level of the steam 176. The second state occurs when the water 174 in the one or more water tanks 107 drains from the one or more water tanks 107 such that the level of the water 174 in the one or more water tanks 107 decreases. For example, the second state occurs during the transient operation conditions of the gas turbine engine 10 when the steam system 100 is unable to extract the equal amount of the water 174 or the greater amount of the water 174 necessary for generating the operating level of the steam 176. In this way, the second state occurs when the steam system 100 extracts a second amount of the water 174 that is a lesser amount of the water 174 than is necessary for generating the operating level of the steam 176. In some embodiments, the water tank 107 is filled with the water 174 on the ground prior to the gas turbine engine 10 powering on (e.g., by a human). In some embodiments, the water tank 107 is primed with the water 174 prior to initiating injection of the steam 176. In some embodiments, the water tank 107 collects the water 174 while the gas turbine engine 10 is operating at idle conditions.

In certain conditions, when the gas turbine engine 10 is not operating (e.g., when the gas turbine engine 10 is shut down), the water 174 in the steam system 100 can be subject to freezing. For example, when the gas turbine engine 10 is shut down and the temperature is below freezing (e.g., less than 0° C.), the water 174 in the steam system 100 may potentially freeze. To prevent the water 174 from freezing in the steam system 100, the drain system 120 may be operated to drain the water 174 from the steam system 100. For example, each of the one or more drain valves 122 opens when the gas turbine engine 10 is shut down such that the water 174 drains from the steam system 100, and may, for example, be provided via the water pump 180 to the water storage tank 17. The water storage tank 17 may include heating elements (not shown) to prevent the water 23 in the water storage tank 17 from freezing. In some embodiments, the controller 96 determines that the gas turbine engine 10 is in a shutdown mode, and opens the one or more drain valves 122 and opens the one or more vents 124 upon determining the gas turbine engine 10 is in the shutdown mode. The one or more drain valves 122 and the one or more vents 124 can be opened and closed individually such that only certain ones of the one or more drain valves 122 and the one or more vents 124 are opened during the shutdown.

Figure 3:
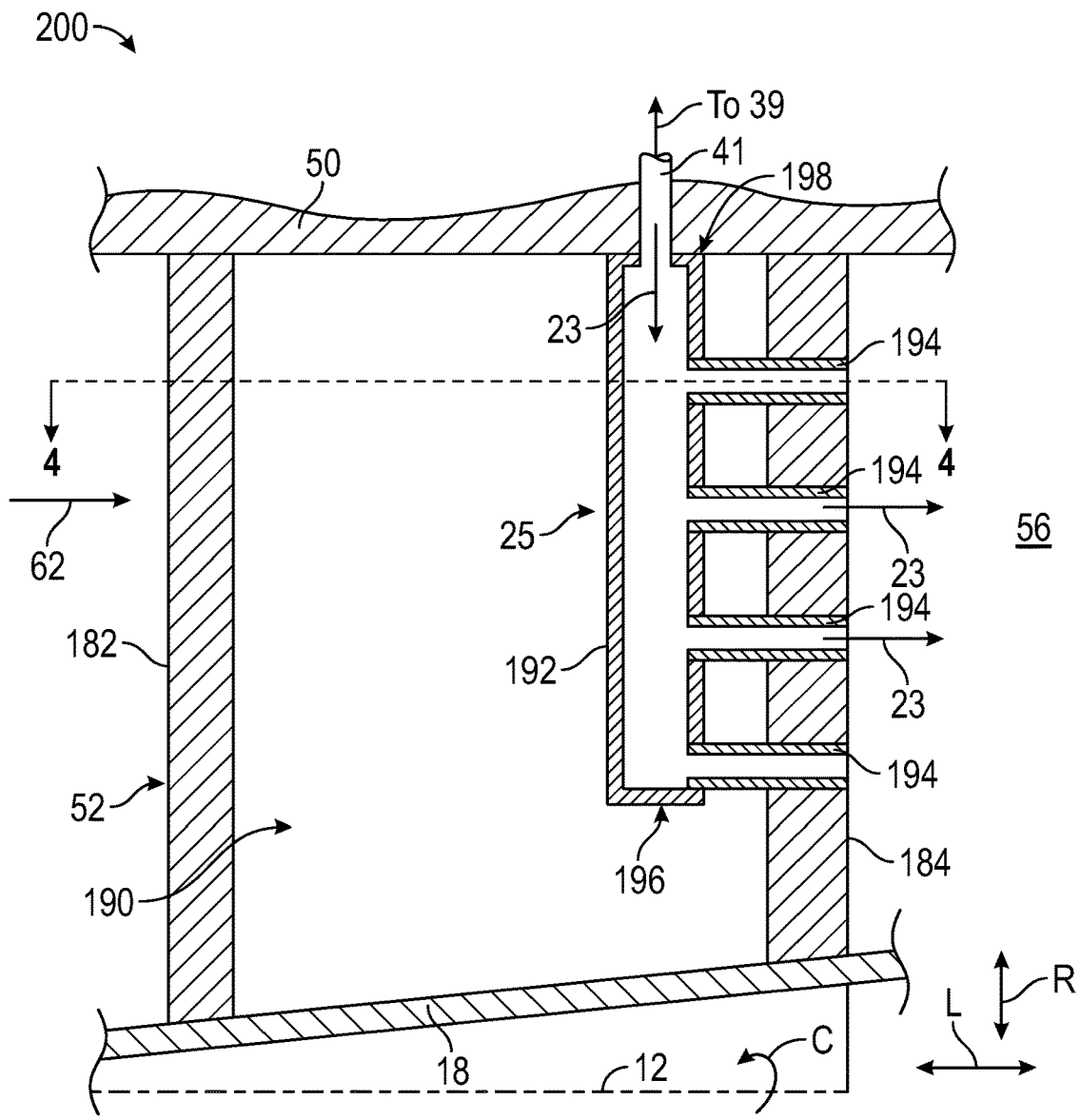
FIG. 3 is an enlarged partial cross-sectional view of an outlet guide vane and a water injection nozzle assembly, taken at detail view 200 of FIG. 1, according to an aspect of the present disclosure.
Figure 4:
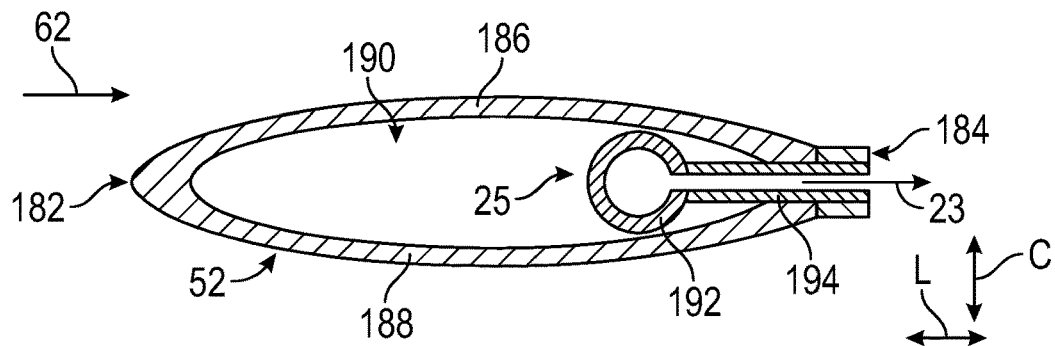
FIG. 4 is a partial cross-sectional view of the outlet guide vane and the water injection nozzle assembly, taken at plane 4-4 of FIG. 3, according to an aspect of the present disclosure.

FIG. 3 is an enlarged partial cross-sectional view of the outlet guide vane 52 and the water injection nozzle assembly 25, taken at detail view 200 of FIG. 1, according to an aspect of the present disclosure. FIG. 4 is a partial cross-sectional view of the outlet guide vane 52 and the water injection nozzle assembly 25, taken at plane 4-4 of FIG. 3, according to an aspect of the present disclosure. Referring collectively to FIG. 3 and to FIG. 4, the outlet guide vane 52 is seen to extend between the nacelle 50 and the outer casing 18 of the core turbine engine 16 (FIG. 1). The outlet guide vane 52 may have an aerodynamic shape, such as a National Advisory Committed for Aeronautics (NACA) airfoil shape, and includes a leading edge 182, a trailing edge 184, a first sidewall 186 extending from the leading edge 182 to the trailing edge 184, and a second sidewall 188 extending from the leading edge 182 to the trailing edge 184. The outlet guide vane 52 may be formed with a hollow cavity 190 therewithin. The water injection nozzle assembly 25 is provided within the hollow cavity 190 of the outlet guide vane 52. The water injection nozzle assembly 25 includes a water nozzle main body 192 and a plurality of water injection nozzles 194. The water nozzle main body 192 may be a tubular body that is closed at a first end 196 and is connected to the water supply line 41 at a second end 198. As described above, the water supply line 41 is connected to the first manifold 39. The plurality of water injection nozzles 194 extend through the trailing edge 184 of the outlet guide vane 52 and may be any type of nozzle, such as a stream nozzle, a spray nozzle, etc. While FIG. 3 depicts the water injection nozzle assembly 25 having four water injection nozzles 194, more than four water injection nozzles 194 or fewer than four water injection nozzles 194 may be included instead. In addition, while FIG. 3 and FIG. 4 depict the water injection nozzles 194 extending through the trailing edge 184 of the outlet guide vane 52, as will be described below, the water injection nozzles 194 may extend through other portions of the outlet guide vane 52. In some other aspects, the water injection nozzle assembly 25 need not be positioned within the outlet guide vane 52, but may be located within the bypass airflow passage 56 external to the outlet guide vane 52. For example, the water injection nozzle assembly 25 may be located external to the outlet guide vane 52 along the trailing edge 184 of the outlet guide vane 52.

Alternatively, the water injection nozzle assembly 25 may be located circumferentially between respective ones of outlet guide vanes 52. Thus, the configuration of the aspects shown in FIG. 3 and FIG. 4 is merely one example of a location and an arrangement of the water injection nozzle assemblies 25, and other arrangements may be provided without departing from the scope of the present disclosure.

In operation, as was discussed above, when thrust augmentation may be desired, the controller 96 controls the bypass airflow passage water injection system 15 (FIG. 1) to provide the flow of the water 23 from the water storage tank 17 (FIG. 1) to the first manifold 39, and the water 23 flows from the first manifold 39 to the water injection nozzle assembly 25 such that the water 23 flows into the water nozzle main body 192 and through the water injection nozzles 194 into the bypass airflow passage 56.

Figure 5:
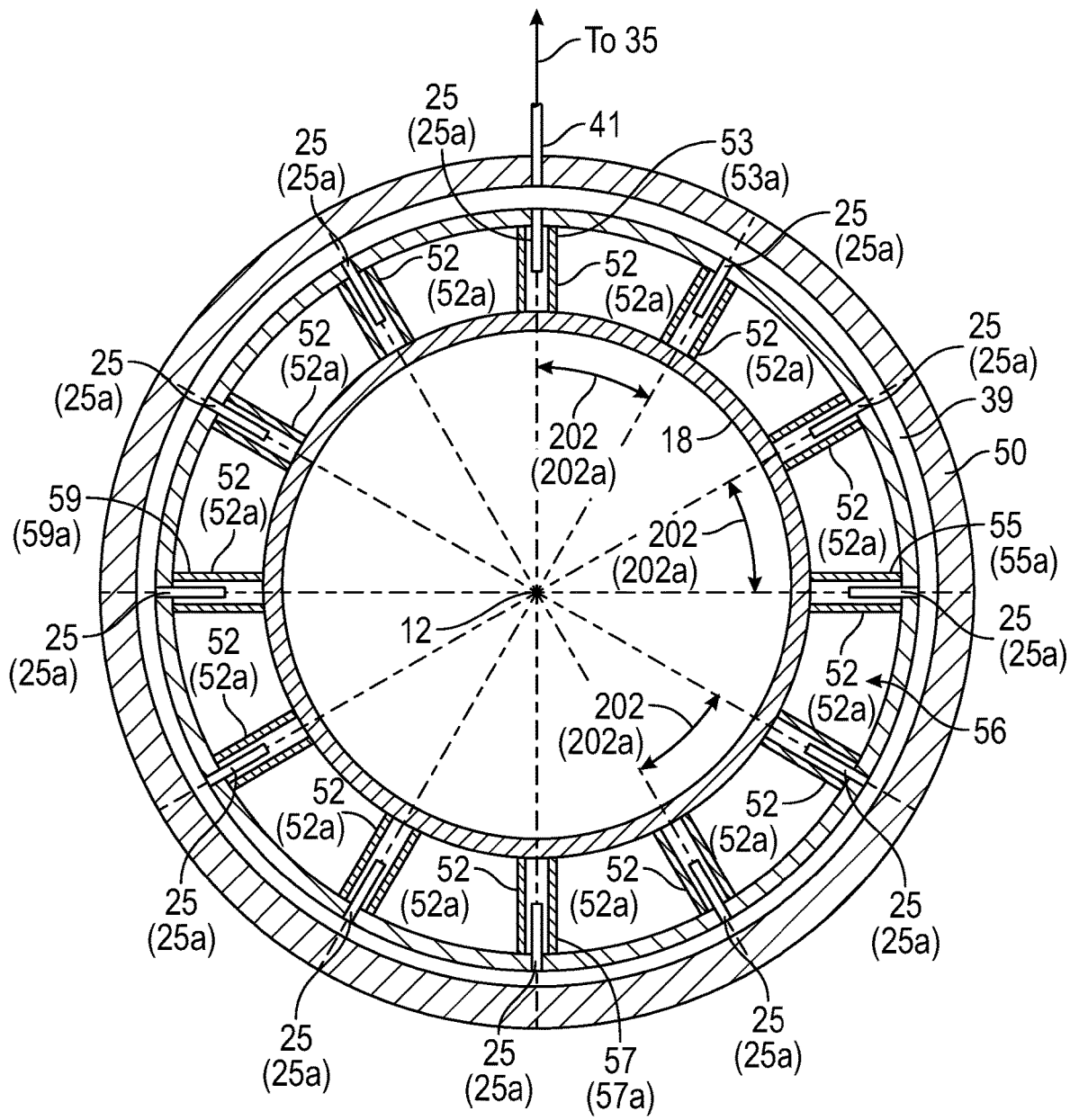
FIG. 5 is a partial cross-sectional forward-looking view through the gas turbine engine, taken at plane 5-5 in FIG. 1, according to an aspect of the present disclosure.

FIG. 5 is a partial cross-sectional forward-looking view through the gas turbine engine, taken at plane 5-5 in FIG. 1, according to an aspect of the present disclosure. In FIG. 5, the core turbine engine 16 components within the outer casing 18 are not shown. FIG. 5 depicts a circumferential spacing of the outlet guide vanes 52 about the longitudinal centerline axis 12. In FIG. 5, twelve outlet guide vanes 52 are depicted as being circumferentially spaced apart about the longitudinal centerline axis 12, but more than twelve outlet guide vanes 52 or fewer than twelve outlet guide vanes 52 may be included instead. Respective ones of the twelve outlet guide vanes 52 are circumferentially spaced apart from one another by a circumferential spacing 202, and the twelve outlet guide vanes 52 are equally spaced apart. With the twelve outlet guide vanes 52 being equally spaced apart, the circumferential spacing 202 is thirty degrees. As shown in FIG. 5, the first manifold 39 extends circumferentially about the longitudinal centerline axis 12 within the nacelle 50, and is connected to the water valve 35 via the water supply line 41.

Each of the outlet guide vanes 52 in FIG. 5 may have the configuration as shown in FIG. 3 and FIG. 4, such that the water injection nozzle assembly 25 is contained within the outlet guide vanes 52. FIG. 5 depicts each of the twelve outlet guide vanes 52 as including the water injection nozzle assembly 25, but fewer than all twelve of the outlet guide vanes 52 may include the water injection nozzle assembly 25. For example, only four of the outlet guide vanes 52 may include the water injection nozzle assembly 25, including a first outlet guide vane 53 arranged at a twelve o'clock position, a second outlet guide vane 55 arranged at a three o'clock position, a third outlet guide vane 57 arranged at a six o'clock position, and a fourth outlet guide vane 59 arranged at a nine o'clock position. The remaining outlet guide vanes 52 may not include the water injection nozzle assembly 25. The present disclosure is not limited to either of the foregoing arrangements, and other arrangements may be included instead.

Figure 6:
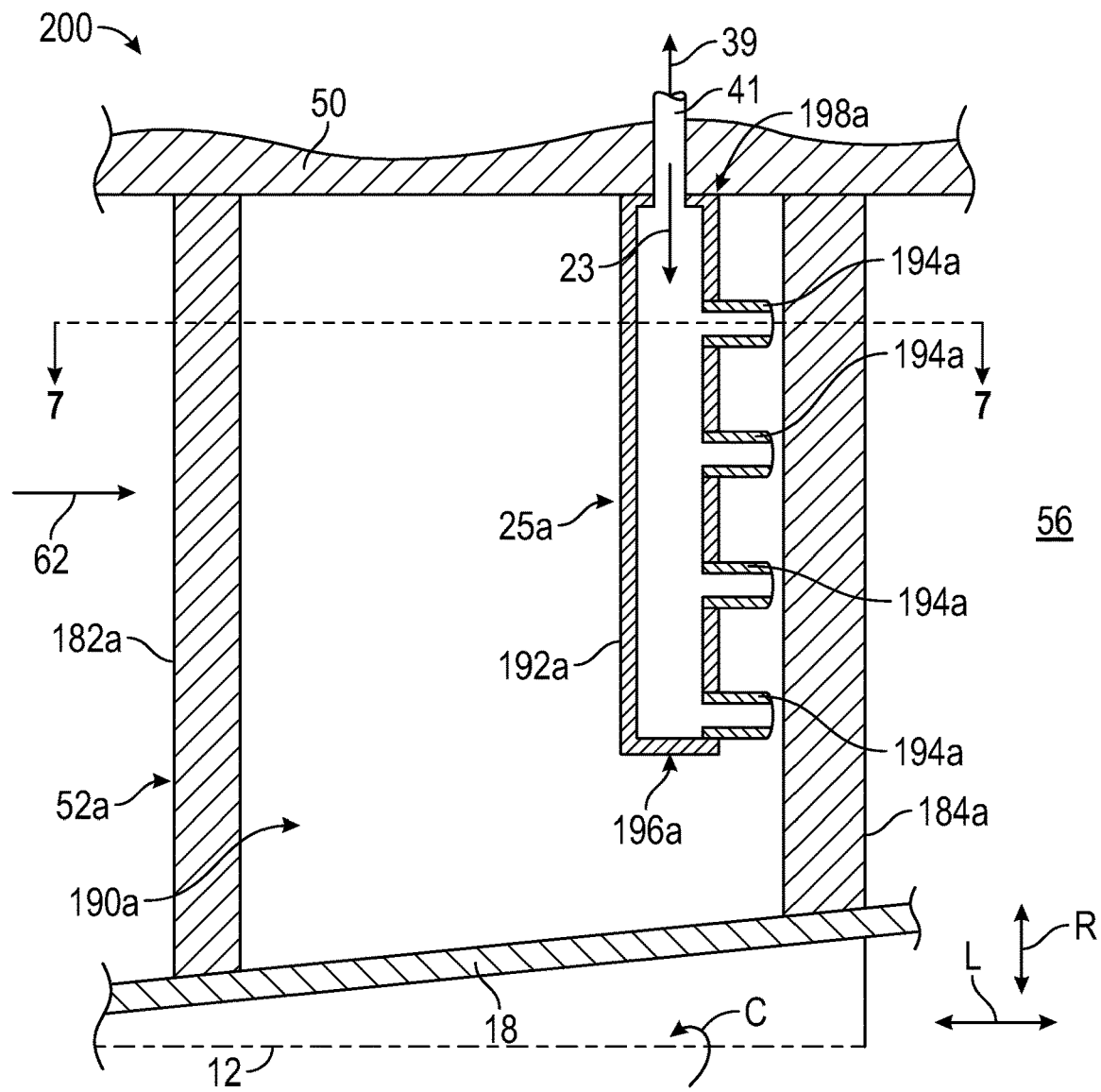
FIG. 6 is an enlarged partial cross-sectional view of an alternate outlet guide vane and water injection nozzle assembly to that shown in FIG. 3, according to an aspect of the present disclosure.
Figure 7:
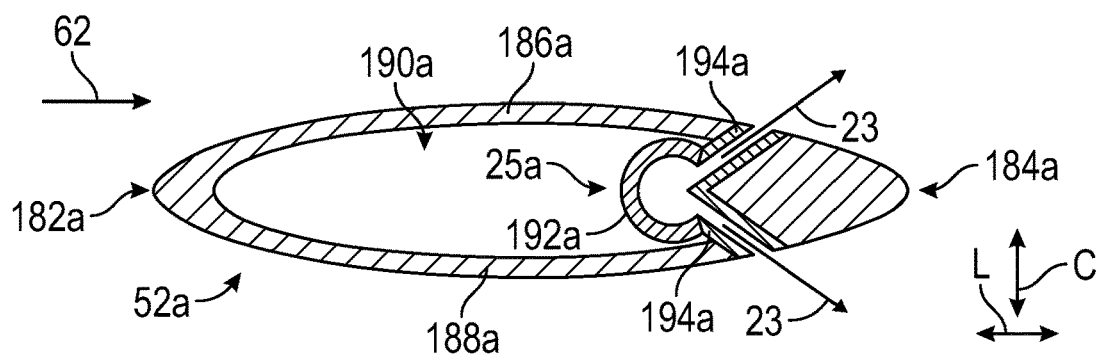
FIG. 7 is a partial cross-sectional view of the alternate outlet guide vane and the water injection nozzle assembly of FIG. 6, taken at plane 7-7 of FIG. 6, according to an aspect of the present disclosure.

FIG. 6 is an enlarged partial cross-sectional view of an alternate outlet guide vane 52a and the water injection nozzle assembly 25a to that shown in FIG. 3, according to an aspect of the present disclosure. FIG. 7 is a partial cross-sectional view of the outlet guide vane 52a and the water injection nozzle assembly 25a, taken at plane 7-7 of FIG. 6, according to an aspect of the present disclosure. Referring collectively to FIG. 6 and to FIG. 7, the outlet guide vane 52a is similar to the outlet guide vane 52 of FIG. 3 and is seen to extend between the nacelle 50 and the outer casing 18 of the core turbine engine 16. The outlet guide vane 52a may have an aerodynamic shape, such as a NACA airfoil shape, and includes a leading edge 182a, a trailing edge 184a, a first sidewall 186a extending from the leading edge 182a to the trailing edge 184a, and a second sidewall 188a extending from the leading edge 182a to the trailing edge 184a. The outlet guide vane 52a may be formed with a hollow cavity 190a therewithin. The water injection nozzle assembly 25a is provided within the hollow cavity 190a of the outlet guide vane 52a. Similar to the FIG. 3 aspect, the water injection nozzle assembly 25a includes a water nozzle main body 192a and a plurality of water injection nozzles 194a. The water nozzle main body 192a may be a tubular body that is closed at a first end 196a and is connected to the water supply line 41 at a second end 198a. As described above, the water supply line 41 is connected to the first manifold 39.

In contrast to the FIG. 3 and FIG. 4 aspects where the plurality of water injection nozzles 194 extend through the trailing edge 184 of the outlet guide vane 52, in the FIG. 6 aspect and the FIG. 7 aspect, the plurality of water injection nozzles 194a extend through one of the first sidewall 186a or the second sidewall 188a, or through both of the first sidewall 186a and through the second sidewall 188a. In this manner, the water 23 can be injected into the bypass airflow passage 56 with a tangential flow component (i.e., at least partially in the circumferential direction C). It may be desirable to provide the water injection nozzles 194a through only one of the first sidewall 186a or the second sidewall 188a so that the water 23 is injected in the same tangential direction as a swirl direction of the bypass air 62 within the bypass airflow passage 56. Similar to the FIG. 3 aspect and the FIG. 4 aspect, the water injection nozzles 194a may be any type of nozzle, such as a stream nozzle, a spray nozzle, etc. While FIG. 6 depicts the water injection nozzle assembly 25a having four water injection nozzles 194a, more than four water injection nozzles 194a or fewer than four water injection nozzles 194a may be included instead.

In operation, as was discussed above, when thrust augmentation may be desired, the controller 96 (FIG. 1) controls the bypass airflow passage water injection system 15 (FIG. 1) to provide the flow of the water 23 from the water storage tank 17 (FIG. 1) to the first manifold 39, and the water 23 flows from the first manifold 39 to the water injection nozzle assembly 25a such that the water 23 flows into the water nozzle main body 192a and through the water injection nozzles 194a into the bypass airflow passage 56.

Referring back to FIG. 5, the outlet guide vanes 52a may be circumferentially spaced apart in the same manner as the outlet guide vanes 52 for the FIG. 3 aspect. FIG. 5 depicts a circumferential spacing of the outlet guide vanes 52a about the longitudinal centerline axis 12. In FIG. 5, twelve outlet guide vanes 52a are depicted as being circumferentially spaced apart about the longitudinal centerline axis 12, but more than twelve outlet guide vanes 52a or fewer than twelve outlet guide vanes 52a may be included instead. Respective ones of the twelve outlet guide vanes 52a are circumferentially spaced apart from one another by a circumferential spacing 202a, and the twelve outlet guide vanes 52a are equally spaced apart. With the twelve outlet guide vanes 52a being equally spaced apart, the circumferential spacing 202a is thirty degrees. As shown in FIG. 5, the first manifold 39 extends circumferentially about the longitudinal centerline axis 12 within the nacelle 50, and is connected to the water valve 35 via the water supply line 41.

Each of the outlet guide vanes 52a in FIG. 5 may have the configuration as shown in FIG. 6 and FIG. 7, such that the water injection nozzle assembly 25a is contained within the outlet guide vanes 52a. FIG. 5 depicts each of the twelve outlet guide vanes 52a as including the water injection nozzle assembly 25a, but fewer than all twelve of the outlet guide vanes 52a may include the water injection nozzle assembly 25a. For example, only four of the outlet guide vanes 52a may include the water injection nozzle assembly 25a, including a first outlet guide vane 53a arranged at the twelve o'clock position, a second outlet guide vane 55a arranged at the three o'clock position, a third outlet guide vane 57a arranged at the six o'clock position, and a fourth outlet guide vane 59a arranged at the nine o'clock position. The remaining outlet guide vanes 52a may not include the water injection nozzle assembly 25a. The present disclosure is not limited to either of the foregoing arrangements, and other arrangements may be included instead.

Figure 8:
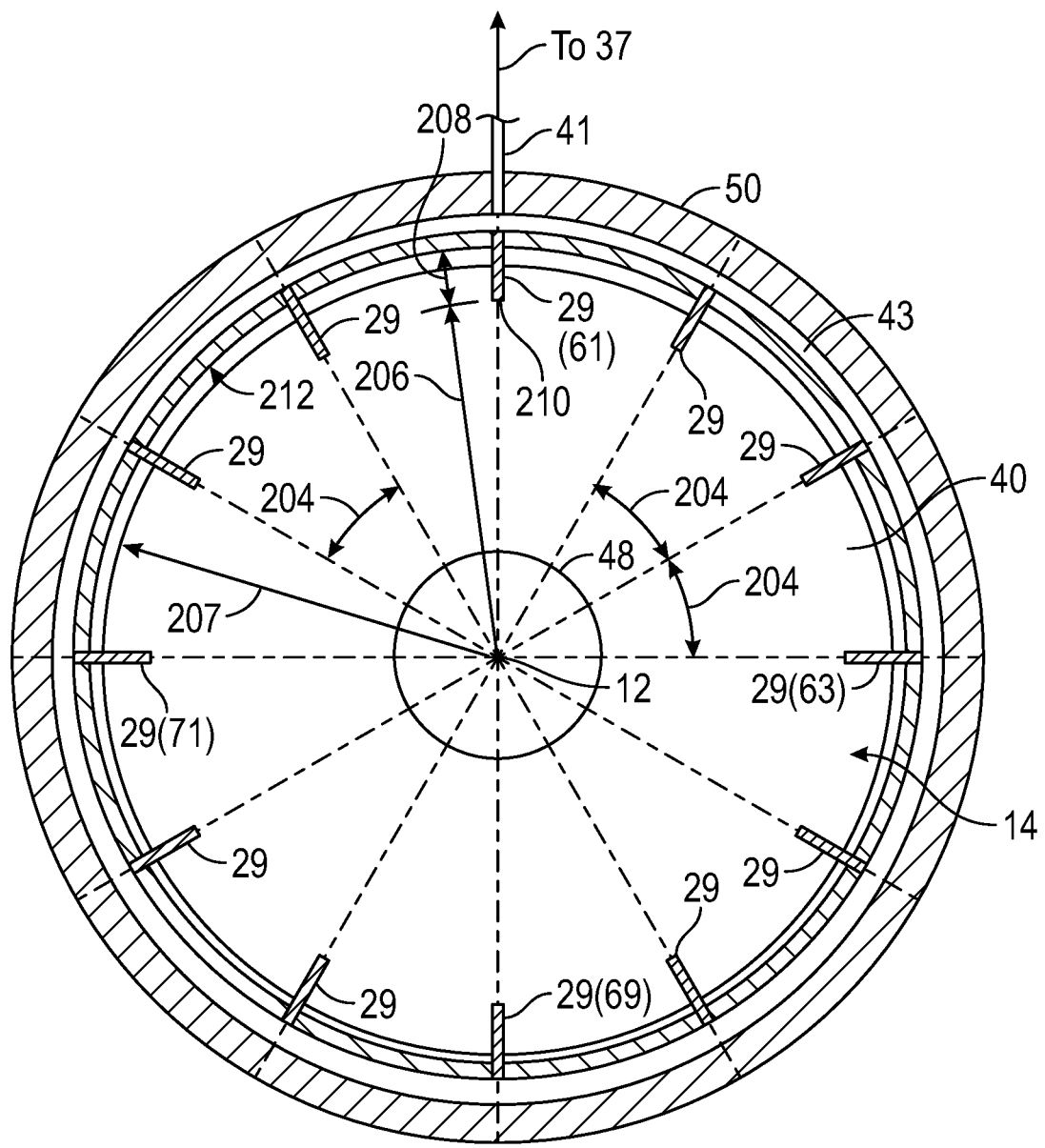
FIG. 8 is a partial cross-sectional aft-looking view of an arrangement of water injection nozzle assemblies arranged forward of a fan section, taken at plane 8-8 of FIG. 1, according to an aspect of the present disclosure.

FIG. 8 is a partial cross-sectional aft-looking view of an arrangement of the water injection nozzle assemblies 29 arranged forward of the fan section 14, taken at plane 8-8 of FIG. 1, according to an aspect of the present disclosure. In FIG. 8, the fan blades 40 are not shown individually, but, rather, are represented by a single disk merely for reference purposes. FIG. 8 depicts a circumferential spacing of the water injection nozzle assemblies 29 about the longitudinal centerline axis 12. In FIG. 8, twelve water injection nozzle assemblies 29 are depicted as being circumferentially spaced apart about the longitudinal centerline axis 12, but more than twelve water injection nozzle assemblies 29, or fewer than twelve water injection nozzle assemblies 29 may be included instead. Respective ones of the twelve water injection nozzle assemblies 29 are circumferentially spaced apart from one another by a circumferential spacing 204, and the twelve water injection nozzle assemblies 29 are equally spaced apart. With the twelve water injection nozzle assemblies 29 being equally spaced apart, the circumferential spacing 204 is thirty degrees. As shown in FIG. 8, the second manifold 43 extends circumferentially about the longitudinal centerline axis 12 within the nacelle 50, and is connected to the water valve 37 (FIG. 1) via the water supply line 41.

While FIG. 8 depicts the twelve water injection nozzle assemblies 29 arranged about the nacelle 50, more than twelve water injection nozzle assemblies 29 or fewer than the twelve water injection nozzle assemblies 29 may be included. For example, only four of the water injection nozzle assemblies 29 may be provided, including a first water injection nozzle assembly 61 arranged at the twelve o'clock position, a second water injection nozzle assembly 63 arranged at the three o'clock position, a third water injection nozzle assembly 69 arranged at the six o'clock position, and a fourth water injection nozzle assembly 71 arranged at the nine o'clock position.

As shown in FIG. 1 and in FIG. 8, the water injection nozzle assemblies 29 are arranged in the nacelle inlet 60 upstream of the fan section 14. In FIG. 8, each of the water injection nozzle assemblies 29 is arranged to inject the water 23 in a water injection zone 208 that is an outer ten percent of a fan radial span 207 of the fan blades 40 from the longitudinal centerline axis 12 and the nacelle 50. That is, a radially inner end 210 of the water injection nozzle assemblies 29 is arranged a radial distance 206 from the longitudinal centerline axis 12, where the radial distance 206 is ninety percent of the total radial distance from the longitudinal centerline axis 12 and an inner surface 212 of the nacelle 50 at the fan section 14.

Figure 9:
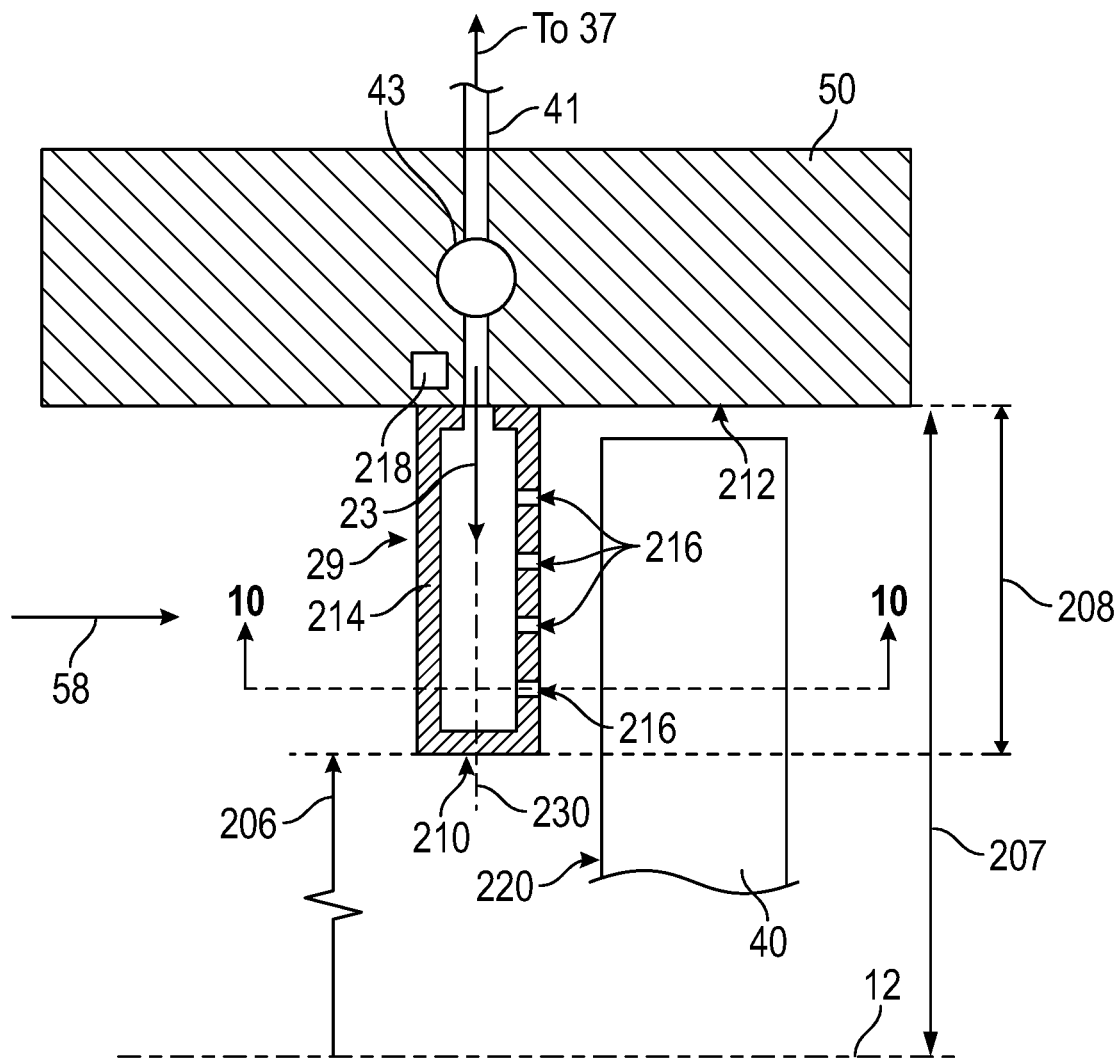
FIG. 9 is an enlarged partial cross-sectional view of a nacelle, a water injection nozzle, and a fan blade, taken at detail view 201 of FIG. 1, according to an aspect of the present disclosure.

FIG. 9 is an enlarged partial cross-sectional view of the nacelle 50, the water injection nozzle assembly 29, and the fan blade 40, taken at detail view 201 of FIG. 1, according to an aspect of the present disclosure. As shown in FIG. 9, the water injection nozzle assembly 29 includes a water injection nozzle main body 214 and a plurality of water injection nozzles 216 arranged through the water injection nozzle main body 214. While FIG. 9 depicts four water injection nozzles 216 through the water injection nozzle main body 214, more than four water injection nozzles 216 or fewer than four water injection nozzles 216 may be included instead. In FIG. 9, for reference purposes, the plurality of water injection nozzles 216 are aligned to inject the water 23 into the water injection zone 208 in the downstream direction (i.e., parallel to the flow direction of the inlet air 58). The water injection nozzle assembly 29 may also include an actuator 218 that provides rotational actuation to rotate the water injection nozzle main body 214 about an axis 230 of the water injection nozzle main body 214, and, thereby, also rotating the water injection nozzles 216 about the axis 230 so as to change a direction of the water injection with respect to the flow direction of the inlet air 58, as will be described in more detail below. The actuator 218 may be controlled by the controller 96.

Figure 10:
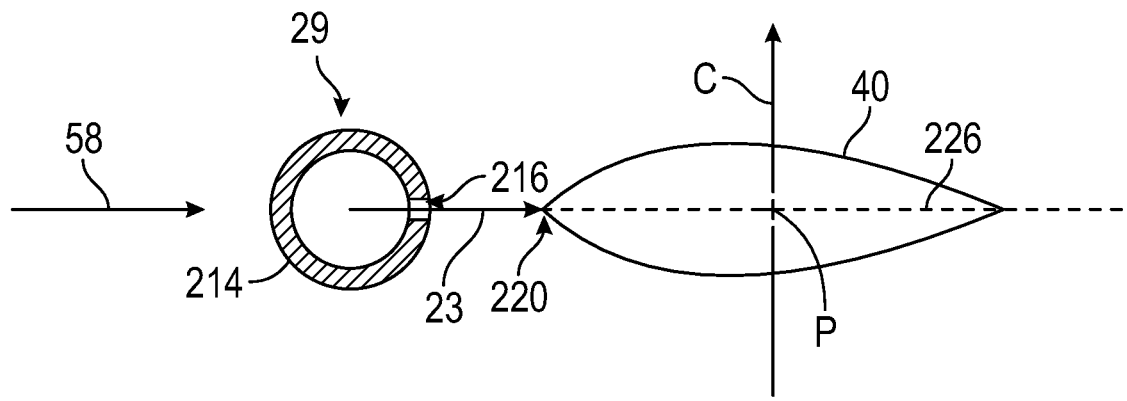
FIG. 10 is a partial cross-sectional view depicting a relationship between the water injection nozzle and the fan blade, taken at plane 10-10 of FIG. 9, according to an aspect of the present disclosure.

FIG. 10 is a partial cross-sectional view depicting a relationship between the water injection nozzle assemblies 29 and the fan blade 40, taken at plane 10-10 of FIG. 9, according to an aspect of the present disclosure. In FIG. 10, the fan blade 40 is depicted as being a NACA airfoil shaped blade having zero camber and a generally linear leading edge 220 along a span of the fan blade 40, and the depiction in FIG. 10 is merely for reference purposes. In practice, however, the fan blades 40 may be cambered, may include spanwise twist, and/or may include spanwise curvature along the leading edge 220 of the fan blade 40. The configuration shown in FIG. 10 is merely for simplicity. In FIG. 10, the fan blade 40 is shown as being arranged in what may be referred to as a "neutral attack angle" in which a fan blade chord 226 is generally parallel with the flow direction of the inlet air 58. When the fan blade 40 is in the neutral attack angle, the plurality of water injection nozzles 216 may be aligned so as to inject the water 23 therefrom toward the leading edge 220 of the fan blade 40 (i.e., parallel with the fan blade chord 226).

Figure 11:
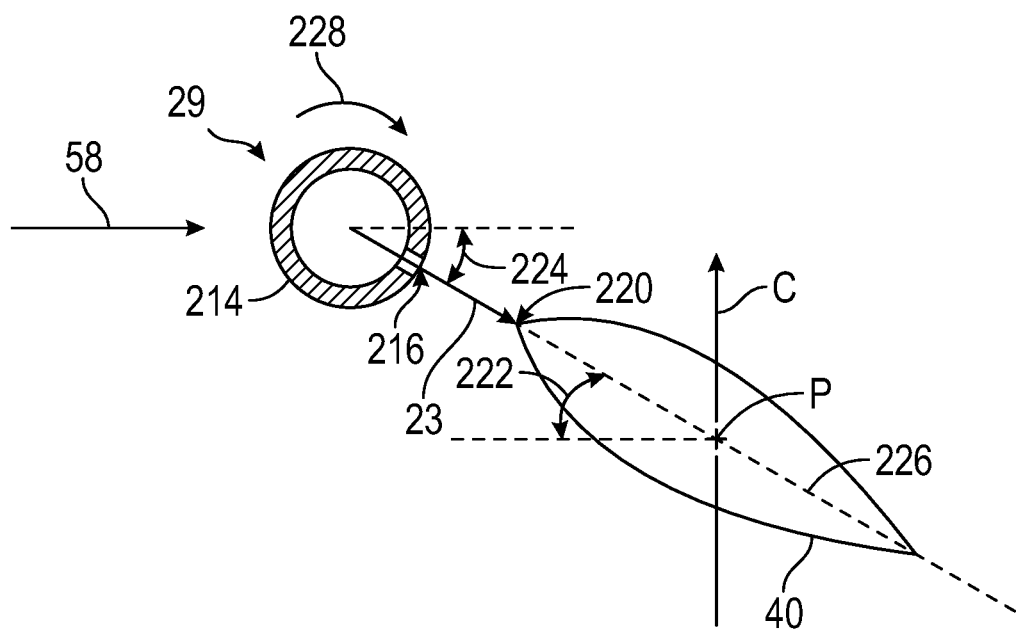
FIG. 11 is an alternate partial cross-sectional view depicting a relationship between the water injection nozzle and the fan blade to that of FIG. 9, after pitching of the fan blade, according to an aspect of the present disclosure.

The foregoing, however, is merely for reference purposes since, in a high power operation of the gas turbine engine 10 when the bypass airflow passage water injection system 15 may be operated, the fan blades 40 would not be operating at the neutral attack angle when the water 23 is injected into the water injection zone 208. Rather, in the high power operation of the gas turbine engine 10, the fan blades 40 are pitched about the pitch axis P to provide thrust (e.g., pitched so as to provide maximum thrust). Thus, FIG. 11 is an alternate partial cross-sectional view depicting a relationship between the water injection nozzle and the fan blade to that of FIG. 9, after pitching of the fan blade 40 about the pitch axis P during the high power operation of the gas turbine engine 10. As shown in FIG. 11, the fan blade 40 is pitched about the pitch axis P to an attack angle 222 with respect to the flow direction of the inlet air 58 (which is presumed to be parallel to the longitudinal centerline axis 12 (FIG. 9) for reference purposes). To maintain the relationship of the injection of the water 23 from the water injection nozzle assembly 29 to the leading edge 220 of the fan blade 40, the actuator 218 (FIG. 9) is actuated to rotate the water injection nozzle main body 214, and, thereby, the water injection nozzles 216 in a rotational direction 228 by a rotational angular amount 224 that provides for the water 23 to be injected toward the leading edge 220 of the fan blade 40 and generally parallel with the fan blade chord 226. The injection of the water 23 into the fan blades 40 in this manner helps to reduce potential erosion of the fan blades 40 caused by the water 23 being injected into the nacelle inlet 60 upstream of the fan section 14.

Figure 12:
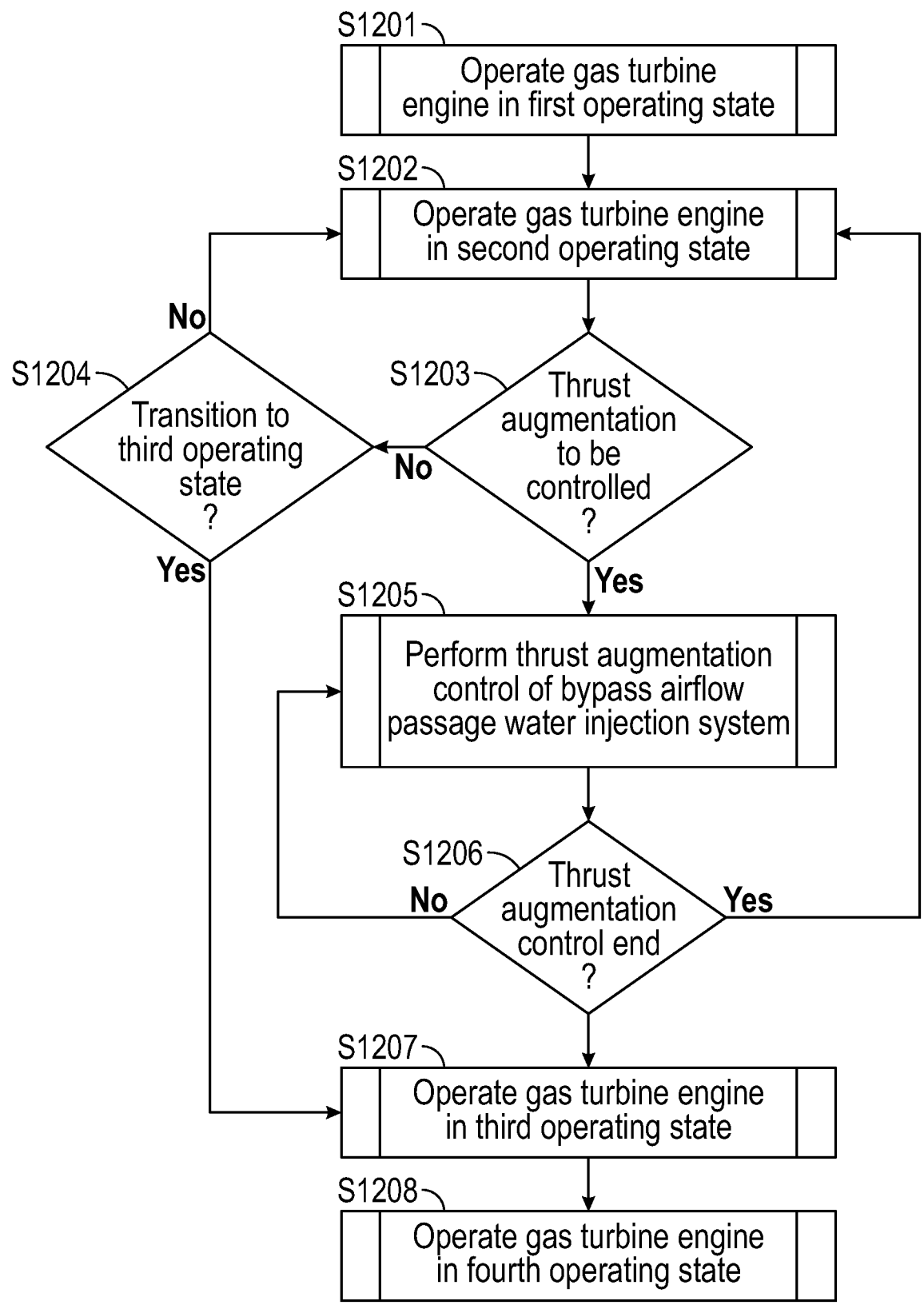
FIG. 12 is a flowchart of process steps for a method of operating a gas turbine engine, according to an aspect of the present disclosure.

FIG. 12 is a flowchart of process steps for a method of operating the gas turbine engine 10, according to an aspect of the present disclosure. In the method, any of the aspects of the gas turbine engine 10 shown and described above with regard to FIG. 1 to FIG. 11 may be utilized to implement the method. In addition, the method may be performed at least in part by the controller 96 (FIG. 1). In step S1201, the gas turbine engine 10 is operated in a first operating state. The first operating state may be, for example, a low power operating state in which the gas turbine engine 10 is operated from initial startup, engine idle, and taxiing of the aircraft. The gas turbine engine 10 may operate in each of the engine idle and taxiing operations as discussed above for the operation of the gas turbine engine 10 with regard to FIG. 1 and FIG. 2.

In step S1202, the gas turbine engine 10 is operated in a second operating state, which may be a high power operating state. The second operating state may be, for example, a takeoff and a climb-out of the aircraft. During the second operating state, in step S1203, a determination may be made whether thrust augmentation is to be controlled. Here, the controller 96 may determine, based on the operation of the gas turbine engine 10 in high power, whether or not thrust augmentation is needed. If thrust augmentation is not to be controlled (NO in step S1203), then a determination may be made in step S1204 whether a transition to a third operating state (e.g., a lower power climb or a cruise state) is to be made. If not (NO in step S1204), then the gas turbine engine 10 continues to operate in the second operating state without the thrust augmentation. At this point, the controller 96 may continue to loop processing through steps S1202, S1203, and S1204 until either a transition to the third operating state is to be made (YES in step S1204), or a determination is made that thrust augmentation is to be controlled (YES in step S1203).

In the case when it is determined in step S1203 that thrust augmentation is to be controlled (YES in step S1203), then a process for performing the thrust augmentation is performed in step S1205. The process of step S1205 will be discussed below with regard to FIG. 13. If a determination is made during the process of step S1205 that the thrust augmentation control is to end (YES in step S1206), then the gas turbine engine 10 returns to the second operating state of step S1202 without the thrust augmentation. If, during the process of step S1206 a determination is made that the thrust augmentation is not to end (NO in step S1206), then the thrust augmentation process of step S1205 continues.

On the other hand, in the case when it is determined in step S1204 that the transition to the third operating state is to be made (YES in step S1204), then, in step S1207, the controller 96 transitions from the second operating state to the third operating state and operates the gas turbine engine in the third operating state. Again, the third operating state may be a lower power climb or a cruise state. Following the operation of the gas turbine engine 10 in the third operating state (e.g., at the end of the cruise state), in step S1208, the gas turbine engine 10 is operated in a fourth operating state, which may be a low power state for descent, landing approach, landing, taxiing, and engine shutdown at the end of a flight.

Figure 13:
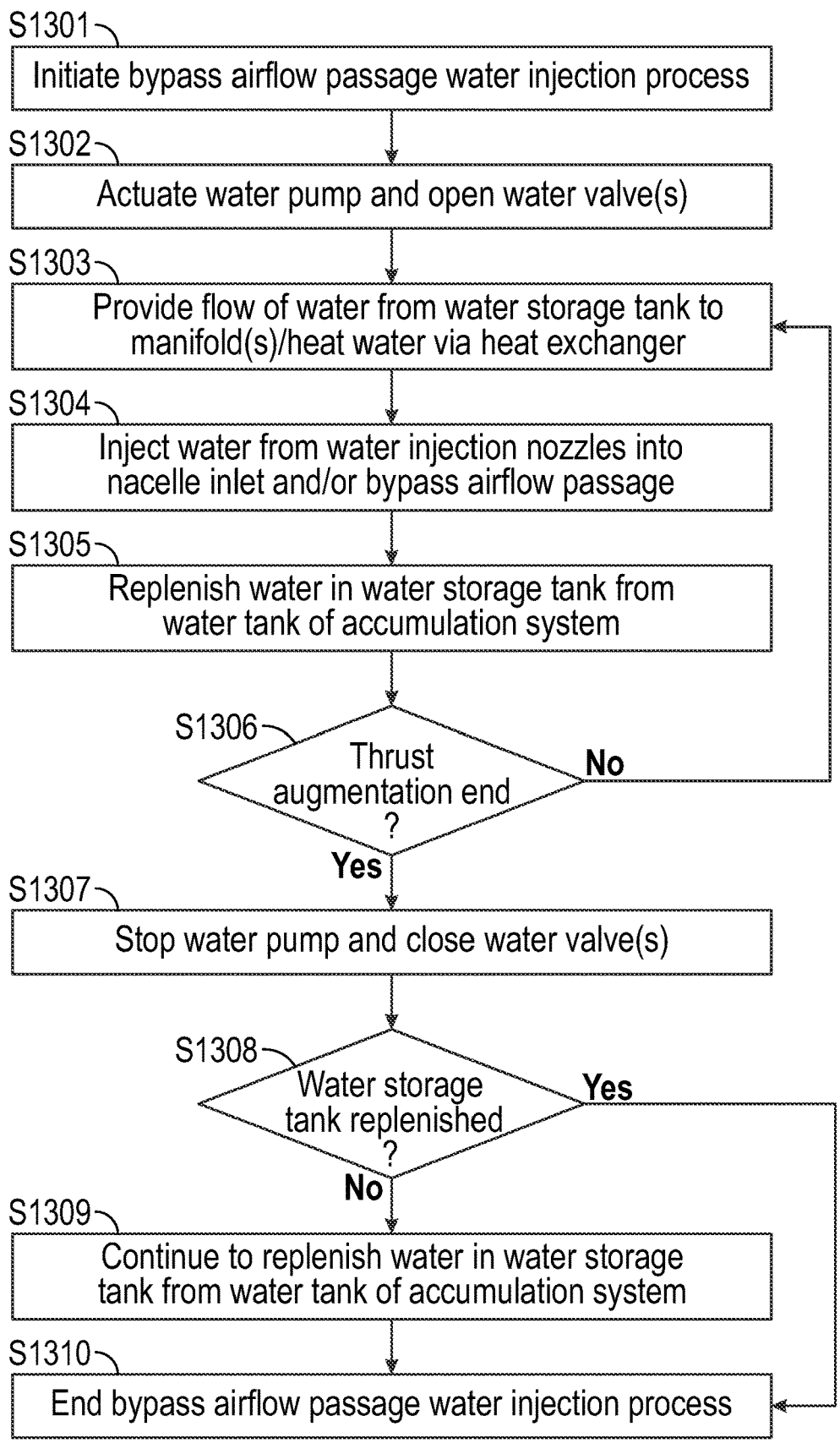
FIG. 13 is a flowchart of process steps for a water injection thrust augmentation process, according to an aspect of the present disclosure.

FIG. 13 is a flowchart of process steps for performing the water injection thrust augmentation process of step S1205 of FIG. 12, according to an aspect of the present disclosure. As discussed above, the controller 96 may control the various components to perform the thrust augmentation process. The thrust augmentation process may be performed by any of the aspects discussed above for FIG. 1 to FIG. 11. In step S1301, the controller 96 initiates the bypass airflow passage water injection system 15 to perform the process of step S1206 (FIG. 12). In step S1302, the controller 96 actuates the water pump 31 to start operation, and actuates either or both of the water valve 35 and/or the water valve 37 to an open state. In step S1303, the water pump 31 provides a flow of the water 23 from the water storage tank 17 to either the first manifold 39 or to the second manifold 43, or to both the first manifold 39 and to the second manifold 43. When the heat exchanger 47 is included in the water injection supply system 19, the flow of water 23 from the water storage tank 17 passes through the heat exchanger 47 to heat the water 23 prior to the water 23 flowing downstream of the heat exchanger 47. In the case when the controller 96 controls the water valve 37 to be in a closed state and controls the water valve 35 to be in the open state, the water 23 is provided to the first manifold 39. In the case when the water valve 37 is controlled to be in the open state and the water valve 35 is controlled to be in the closed state, the water 23 is provided to the second manifold 43. In the case when both the water valve 35 and the water valve 37 are controlled to be in the open state, the water 23 is provided to both the first manifold 39 and to the second manifold 43.

In step S1304, the water 23 is injected into either one of, or both of, the bypass airflow passage 56 and/or the nacelle inlet 60. In the case when the water 23 is provided to the first manifold 39, the water 23 is injected into the bypass airflow passage 56 via the water injection nozzle assemblies 25 (FIG. 3 to FIG. 5), or via the water injection nozzle assemblies 25a (FIGS. 6, 7 and 5). On the other hand, in the case when the water 23 is provided to the second manifold 43, the water 23 is injected into the nacelle inlet 60 via the water injection nozzle assemblies 29 (FIGS. 8 to 11).

At the same time as performing the thrust augmentation by injecting the water 23 into either the bypass airflow passage 56 or into the nacelle inlet 60, or into both the bypass airflow passage 56 and into the nacelle inlet 60, as was described above with regard to FIG. 2, in step S1305, the water accumulation system 101 accumulates the water 174 in the one or more water tanks 107, and the water pump 180 is controlled by the controller 96 to provide the flow of the water 174 to the water storage tank 17 to replenish the water 23 therein. In step S1305, the water accumulation system 101 may accumulate the water 174 by the steam system 100 generating the steam 176 via the boiler 102, and providing the generated steam 176 to the steam turbine 110 of the core turbine engine 16, and then condensing the exhaust 66 via the condenser 104 to obtain water and air that is then separated via the separator 106 to provide the separated water 174 to the water tank 107 of the water accumulation system 101. The water accumulation system 101 provides the water 174 from the water tank 107 to the water storage tank 17.

During the thrust augmentation process, a determination is made in step S1306 whether the thrust augmentation process is to end. Step S1306 may be the same as step S1206 of FIG. 12. This determination may be made by determining whether or not a reduction in power is being transitioned (e.g., transitioning to the third operating state) or whether sufficient thrust is being provided by the gas turbine engine 10 such that the thrust augmentation is no longer needed. If it is determined in step S1306 that the thrust augmentation is not to end (NO in step S1306), then the thrust augmentation in step S1303 continues. On the other hand, if it is determined in step S1306 that the thrust augmentation is to end (YES in step S1306), then, in step S1307, the controller stops the water pump 31, and closes the water valve 35 and/or the water valve 37 to stop the flow of the water 23 through the water injection supply system 19.

While the thrust augmentation process may terminate at step S1307, the replenishment of the water 23 in the water storage tank 17 by the water accumulation system 101 may continue. In step S1308, a determination is made whether sufficient water has been replenished to the water storage tank 17, and, if not, then, in step S1309, the replenishment continues until sufficient water is replenished to the water storage tank 17. If sufficient water has been replenished to the water storage tank 17 (YES in step S1308), then the bypass airflow passage water injection process for the bypass airflow passage water injection system 15 ends in step S1310.

Further aspects of the present disclosure are provided by the subject matter of the following clauses.

A gas turbine engine including a core turbine engine, a fan section drivingly connected to the core turbine engine, the fan section including a fan having a plurality of fan blades, a nacelle surrounding the fan section and at least a portion of the core turbine engine, the nacelle defining an inlet arranged upstream of the fan, and a bypass flow passage downstream of the fan, the bypass flow passage defined between the nacelle and the core turbine engine, and a bypass flow passage water injection system including (a) at least one water injection nozzle assembly arranged to inject water into at least one of the inlet or the bypass flow passage, and (b) a water injection supply system arranged to supply water from a water storage tank to the at least one water injection nozzle assembly.

The gas turbine engine according to the preceding clause, further including a controller arranged to control the water injection supply system to provide a flow of water from the water storage tank to the at least one water injection nozzle assembly, the controller controlling the water injection supply system during a high-power operating state of the gas turbine engine to augment thrust of the gas turbine engine.

The gas turbine engine according to any preceding clause, wherein the at least one water injection nozzle assembly is arranged downstream of the fan section within the bypass flow passage.

The gas turbine engine according to any preceding clause, further including a plurality of outlet guide vanes connecting the nacelle and the core turbine engine, the plurality of outlet guide vanes being arranged downstream of the fan and within the bypass flow passage, the at least one water injection nozzle assembly including a plurality of water injection nozzle assemblies each being arranged within respective ones of the plurality of outlet guide vanes.

The gas turbine engine according to any preceding clause, wherein, in respective ones of the plurality of outlet guide vanes, the respective water injection nozzle assembly is arranged through a trailing edge of the outlet guide vane to inject water into the bypass flow passage.

The gas turbine engine according to any preceding clause, wherein, in respective ones of the plurality of outlet guide vanes, the respective water injection nozzle assembly is arranged through at least one of a first sidewall or a second sidewall of the outlet guide vane to inject the water into the bypass flow passage in a tangential direction with respect to a centerline axis of the gas turbine engine.

The gas turbine engine according to any preceding clause, wherein the at least one water injection nozzle assembly is arranged in the inlet of the nacelle, and is arranged to direct a flow of water therefrom at a zero degree attack angle with respect to a leading edge of each fan blade of the fan blades.

The gas turbine engine according to any preceding clause, wherein the at least one water injection nozzle assembly is arranged to inject the water into a water injection zone that is an outer ten percent of a fan radial span of the fan.

The gas turbine engine according to any preceding clause, further including (i) a steam generation system that generates steam that is provided to a steam turbine of the core turbine engine, and (ii) a water accumulation system that accumulates water generated by the steam generation system, the water accumulation system providing a flow of accumulated water to the water storage tank.

The gas turbine engine according to any preceding clause, wherein the steam generation system includes (i) the steam turbine of the core turbine engine, (ii) a boiler that generates steam utilizing exhaust from the core turbine engine, (iii) a condenser that condenses the exhaust utilized by the boiler to obtain a water/air mixture, and (iv) a separator that separates the water/air mixture and provides water therefrom to the water accumulation system.

The gas turbine engine according to any preceding clause, wherein the water accumulation system includes a water pump controlled by a controller to provide a flow of water from a water tank in the water accumulation system to the water storage tank.

The gas turbine engine according to any preceding clause, wherein the water injection supply system includes (i) at least one water valve, (ii) at least one water pump, and (iii) a controller that controls the at least one water valve and the at least one water pump to provide a flow of water from the water storage tank to the at least one water injection nozzle assembly.

The gas turbine engine according to any preceding clause, wherein the water injection supply system further includes a heat exchanger that is arranged to heat the flow of the water from the water storage tank to the at least one water injection nozzle assembly.

The turbine engine of any preceding clause, further including a combustor, wherein the combustor is fluidly coupled to the steam generation system to receive steam, the steam being injected into the combustor.

The turbine engine of any preceding clause, further wherein the boiler is located downstream of the combustor, the boiler receiving water and being fluidly connected to the combustor to receive the combustion gases and to boil the water to generate steam.

The turbine engine of any preceding clause, further comprising a core shaft, a turbine located in a hot gas path downstream of the combustor, and the steam turbine. The turbine located in the hot gas path downstream of the combustor receives the combustion gases and causes the turbine to rotate. The turbine is coupled to the core shaft to rotate the core shaft when the turbine rotates. The steam turbine is fluidly coupled to the boiler to receive the steam from the boiler and to cause the steam turbine to rotate, the steam turbine being coupled to the core shaft to rotate the core shaft when the steam turbine rotates.

The turbine engine of any preceding clause, wherein the core shaft is a low-pressure shaft and the turbine is a low-pressure turbine.

The turbine engine of any preceding clause, further comprising a fan including a plurality of blades and a fan shaft, the fan shaft being coupled to the low-pressure shaft to be driven by the low-pressure shaft.

The turbine engine of any preceding clause, further comprising a bypass airflow passage and a condenser. A first portion of air flowing into the fan flows through the bypass airflow passage as bypass air and a second portion of the air flowing into the fan flows through the core air flow path as core air. The condenser is positioned downstream of the boiler and in the bypass airflow passage for bypass air to cool the combustion gases and to condense the water from the combustion gases.

The turbine engine of any preceding clause, further comprising a condenser located downstream of the boiler to condense water from the combustion gases and to generate an exhaust-water mixture.

The turbine engine of the preceding clause, further comprising a water separator located downstream of the condenser, the water separator separating the water from the exhaust-water mixture and the water separator fluidly connected to the boiler to provide the water to the boiler.

The turbine engine of the preceding clause, wherein the water separator is a cyclonic separator.

The turbine engine of any preceding clause, wherein the boiler is fluidly coupled to the water separator.

The turbine engine of any preceding clause, further comprising a water pump in fluid communication with the water separator and with the boiler to direct the flow of water from the water separator into the boiler.

The turbine engine of any preceding clause, further comprising a high-pressure shaft, a high-pressure turbine, and a high-pressure compressor. The high-pressure turbine is positioned downstream of the combustor to receive the combustion gases and to cause the high-pressure turbine to rotate. The high-pressure turbine is coupled to the high-pressure shaft to rotate the high-pressure shaft when the high-pressure turbine rotates. The high-pressure compressor is positioned in the core air flow path upstream of the combustor and downstream of the low-pressure compressor. The high-pressure compressor is driven by the high-pressure shaft to compress the core air flowing through the core air flow path and to generate the compressed air.

A method of operating a gas turbine engine, the gas turbine engine including (a) a core turbine engine, (b) a fan section drivingly connected to the core turbine engine, the fan section including a fan having a plurality of fan blades, (c) a nacelle surrounding the fan section and at least a portion of the core turbine engine, the nacelle defining a fan inlet portion arranged upstream of the fan, and a bypass flow passage downstream of the fan, the bypass flow passage defined between the nacelle and the core turbine engine, and (d) a bypass flow passage water injection system including (i) at least one water injection nozzle assembly arranged to inject water into at least one of the fan inlet portion or the bypass flow passage, (ii) a water injection supply system arranged to supply water from a water storage tank to the at least one water injection nozzle assembly, and (iii) a controller controlling the water injection supply system, the method including operating the gas turbine engine in a first operating state, operating the gas turbine engine in a second operating state, the second operating state being a high-power operating state, and controlling, by the controller during the high-power operating state, the water injection supply system to provide a flow of water from the water storage tank to the at least one water injection nozzle assembly to inject a flow of water into at least one of the inlet of the nacelle, or into the bypass flow passage, to increase thrust generated by the gas turbine engine.

The method according to the preceding clause, wherein the at least one water injection nozzle assembly is arranged in the inlet of the nacelle, the method further including, in the controlling the water injection supply system, directing a flow of the water from the at least one water injection nozzle assembly at a zero degree attack angle with respect to a leading edge of each fan blade of the plurality of fan blades.

The method according to any preceding clause, wherein the water injection supply system includes a heat exchanger, and the method further includes, heating, by the heat exchanger, the water flowing through the water injection supply system, and, in the controlling, the water injection supply system is controlled to provide a flow of heated water to the at least one water injection nozzle assembly to inject a flow of the heated water into at least one of the inlet of the nacelle, or into the bypass flow passage, to increase thrust generated by the gas turbine engine.

The method according to any preceding clause, wherein the gas turbine engine further includes (e) a steam generating system, and (f) a water accumulation system, the method further including, generating steam by the steam generating system, providing the generated steam from the steam generating system to a steam turbine of the core turbine engine, condensing exhaust from the core turbine engine to obtain water and air, separating the obtained water and air, providing the separated water to the water accumulation system, and providing water from the water accumulation system to the water storage tank.

The method according to any preceding clause, wherein the steam generation system includes (i) the steam turbine of the core turbine engine, (ii) a boiler that generates steam utilizing exhaust from the core turbine engine, (iii) a condenser that condenses the exhaust utilized by the boiler to obtain a water/air mixture, and (iv) a separator that separates the water/air mixture and provides water therefrom to the water accumulation system.

The method according to any preceding clause, wherein the gas turbine engine further includes (e) a plurality of outlet guide vanes connecting the nacelle and the core turbine engine, the plurality of outlet guide vanes being arranged downstream of the fan and within the bypass flow passage, and (f) the at least one water injection nozzle assembly including a plurality of water injection nozzle assemblies each being arranged within respective ones of the plurality of outlet guide vanes, the method further including, injecting the water into the bypass flow passage by the plurality of water injection nozzle assemblies.

The method according to any preceding clause, wherein, in respective ones of the plurality of outlet guide vanes, the respective water injection nozzle assembly is arranged through at least one of a first sidewall or a second sidewall of the outlet guide vane, the method further including, in the controlling the water injection supply system, injecting water into the bypass flow passage in a tangential direction with respect to a longitudinal centerline axis of the gas turbine engine.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gas turbine engine comprising:
    a core turbine engine;
    a fan section drivingly connected to the core turbine engine, the fan section including a fan having a plurality of fan blades;
    a nacelle surrounding the fan section and at least a portion of the core turbine engine, the nacelle defining an inlet arranged upstream of the fan, and a bypass flow passage downstream of the fan, the bypass flow passage defined between the nacelle and the core turbine engine;
    a bypass flow passage water injection system including (a) at least one water injection nozzle assembly arranged to inject water into the bypass flow passage, and (b) a water injection supply system arranged to supply water from a water storage tank to the at least one water injection nozzle assembly; and
    a plurality of outlet guide vanes connecting the nacelle and the core turbine engine, the plurality of outlet guide vanes being arranged downstream of the fan and within the bypass flow passage, the at least one water injection nozzle assembly including a plurality of water injection nozzle assemblies each being arranged within respective ones of the plurality of outlet guide vanes.

2. The gas turbine engine according to claim 1, further comprising a controller to control the water injection supply system to provide a flow of water from the water storage tank to the at least one water injection nozzle assembly, the controller controlling the water injection supply system during a high-power operating state of the gas turbine engine to augment thrust of the gas turbine engine.

3. The gas turbine engine according to claim 1, wherein, in respective ones of the plurality of outlet guide vanes, the respective water injection nozzle assembly is arranged through a trailing edge of the respective ones of the plurality of outlet guide vanes to inject water into the bypass flow passage.

4. The gas turbine engine according to claim 1, wherein, in respective ones of the plurality of outlet guide vanes, the respective water injection nozzle assembly is arranged through at least one of a first sidewall or a second sidewall of the respective ones of the plurality of outlet guide vanes to inject the water into the bypass flow passage in a tangential direction with respect to a centerline axis of the gas turbine engine.

5. A gas turbine engine comprising:
    a core turbine engine;
    a fan section drivingly connected to the core turbine engine, the fan section including a fan having a plurality of fan blades;
    a nacelle surrounding the fan section and at least a portion of the core turbine engine, the nacelle defining an inlet arranged upstream of the fan, and a bypass flow passage downstream of the fan, the bypass flow passage defined between the nacelle and the core turbine engine;
    a bypass flow passage water injection system including (a) at least one water injection nozzle assembly arranged to inject water into the inlet, and (b) a water injection supply system arranged to supply water from a water storage tank to the at least one water injection nozzle assembly,
    wherein the at least one water injection nozzle assembly is arranged in the inlet of the nacelle, and is arranged to direct a flow of water therefrom at a zero degree attack angle with respect to a leading edge of each fan blade of the plurality of fan blades.

6. The gas turbine engine according to claim 5, wherein the at least one water injection nozzle assembly is arranged to inject the water into a water injection zone that is an outer ten percent of a fan radial span of the fan.

7. The gas turbine engine according to claim 1, further comprising (i) a steam generation system that generates steam that is provided to a steam turbine of the core turbine engine, and (ii) a water accumulation system that accumulates water generated by the steam generation system, the water accumulation system providing a flow of accumulated water to the water storage tank.

8. The gas turbine engine according to claim 7, wherein the steam generation system includes (i) the steam turbine of the core turbine engine, (ii) a boiler that generates steam utilizing exhaust from the core turbine engine, (iii) a condenser that condenses the exhaust utilized by the boiler to obtain a water/air mixture, and (iv) a separator that separates the water/air mixture and provides water therefrom to the water accumulation system.

9. The gas turbine engine according to claim 7, wherein the water accumulation system includes a water pump controlled by a controller to provide a flow of water from a water tank in the water accumulation system to the water storage tank.

10. The gas turbine engine according to claim 1, wherein the water injection supply system includes (i) at least one water valve, (ii) at least one water pump, and (iii) a controller that controls the at least one water valve and the at least one water pump to provide a flow of water from the water storage tank to the at least one water injection nozzle assembly.

11. The gas turbine engine according to claim 10, wherein the water injection supply system further includes a heat exchanger that is arranged to heat the flow of the water from the water storage tank to the at least one water injection nozzle assembly.

12. A method of operating a gas turbine engine, the gas turbine engine including (a) a core turbine engine, (b) a fan section drivingly connected to the core turbine engine, the fan section including a fan having a plurality of fan blades, (c) a nacelle surrounding the fan section and at least a portion of the core turbine engine, the nacelle defining an inlet arranged upstream of the fan, and a bypass flow passage downstream of the fan, the bypass flow passage defined between the nacelle and the core turbine engine, and (d) a bypass flow passage water injection system including (i) at least one water injection nozzle assembly arranged to inject water into the inlet, (ii) a water injection supply system arranged to supply water from a water storage tank to the at least one water injection nozzle assembly, and (iii) a controller controlling the water injection supply system, the method comprising:
operating the gas turbine engine in a first operating state;
operating the gas turbine engine in a second operating state, the second operating state being a high-power operating state; and
controlling, by the controller during the high-power operating state, the water injection supply system to provide a flow of water from the water storage tank to the at least one water injection nozzle assembly to inject a flow of water into the inlet of the nacelle to increase thrust generated by the gas turbine engine,
wherein the at least one water injection nozzle assembly is arranged in the inlet of the nacelle, and the water injection supply system is controlled to direct the flow of the water from the at least one water injection nozzle assembly at a zero degree attack angle with respect to a leading edge of each fan blade of the plurality of fan blades.

13. The method according to claim 12, wherein the water injection supply system includes a heat exchanger, and the method further comprises:
heating, by the heat exchanger, the water flowing through the water injection supply system, and,
in the controlling, the water injection supply system is controlled to provide a flow of heated water to the at least one water injection nozzle assembly to inject a flow of the heated water into the inlet of the nacelle.

14. The method according to claim 12, wherein the gas turbine engine further includes (e) a steam generating system, and (f) a water accumulation system, the method further comprising:
generating steam by the steam generating system;
providing the generated steam from the steam generating system to a steam turbine of the core turbine engine;
condensing exhaust from the core turbine engine to obtain water and air;
separating the obtained water and air into separated water and separated air;
providing the separated water to the water accumulation system; and
providing water from the water accumulation system to the water storage tank.

15. The method according to claim 14, wherein the steam generation system includes (i) the steam turbine of the core turbine engine, (ii) a boiler that generates steam utilizing exhaust from the core turbine engine, (iii) a condenser that condenses the exhaust utilized by the boiler to obtain a water/air mixture, and (iv) a separator that separates the water/air mixture and provides water therefrom to the water accumulation system.

16. A method of operating a gas turbine engine, the gas turbine engine including (a) a core turbine engine, (b) a fan section drivingly connected to the core turbine engine, the fan section including a fan having a plurality of fan blades, (c) a nacelle surrounding the fan section and at least a portion of the core turbine engine, the nacelle defining an inlet arranged upstream of the fan, and a bypass flow passage downstream of the fan, the bypass flow passage defined between the nacelle and the core turbine engine, (d) a bypass flow passage water injection system including (i) at least one water injection nozzle assembly arranged to inject water into the bypass flow passage, (ii) a water injection supply system arranged to supply water from a water storage tank to the at least one water injection nozzle assembly, and (iii) a controller controlling the water injection supply system, (e) a plurality of outlet guide vanes connecting the nacelle and the core turbine engine, the plurality of outlet guide vanes being arranged downstream of the fan and within the bypass flow passage, and (f) the at least one water injection nozzle assembly including a plurality of water injection nozzle assemblies each being arranged within respective ones of the plurality of outlet guide vanes, the method comprising:
operating the gas turbine engine in a first operating state;
operating the gas turbine engine in a second operating state, the second operating state being a high-power operating state; and
controlling, by the controller during the high-power operating state, the water injection supply system to provide a flow of water from the water storage tank to inject the water into the bypass flow passage by the plurality of water injection nozzle assemblies within the plurality of outlet guide vanes.

17. The method according to claim 16, wherein, in respective ones of the plurality of outlet guide vanes, the respective water injection nozzle assembly is arranged through at least one of a first sidewall or a second sidewall of the outlet guide vane, the method further comprising:

in the controlling the water injection supply system, injecting water into the bypass flow passage in a tangential direction with respect to a longitudinal centerline axis of the gas turbine engine.

18. The method according to claim 16, wherein, in respective ones of the plurality of outlet guide vanes, the respective water injection nozzle assembly is arranged through a trailing edge of the respective ones of the plurality of outlet guide vanes to inject water into the bypass flow passage.

19. The method according to claim 16, wherein the gas turbine engine further comprises (g) a steam generation system that generates steam that is provided to a steam turbine of the core turbine engine, and (h) a water accumulation system that accumulates water generated by the steam generation system, the water accumulation system providing a flow of accumulated water to the water storage tank.

20. The method according to claim 19, wherein the steam generation system includes (1) the steam turbine of the core turbine engine, (2) a boiler that generates steam utilizing exhaust from the core turbine engine, (3) a condenser that condenses the exhaust utilized by the boiler to obtain a water/air mixture, and (4) a separator that separates the water/air mixture and provides water therefrom to the water accumulation system.

21. The gas turbine engine according to claim 5, further comprising (i) a steam generation system that generates steam that is provided to a steam turbine of the core turbine engine, and (ii) a water accumulation system that accumulates water generated by the steam generation system, the water accumulation system providing a flow of accumulated water to the water storage tank.

22. The gas turbine engine according to claim 21, wherein the steam generation system includes (i) the steam turbine of the core turbine engine, (ii) a boiler that generates steam utilizing exhaust from the core turbine engine, (iii) a condenser that condenses the exhaust utilized by the boiler to obtain a water/air mixture, and (iv) a separator that separates the water/air mixture and provides water therefrom to the water accumulation system.

* * * * *